US00RE50421E

(19) United States
(12) Reissued Patent
Bray et al.

(10) Patent Number: US RE50,421 E
(45) Date of Reissued Patent: *May 13, 2025

(54) RELATING TO SMOKING ARTICLE ASSEMBLY

(71) Applicants: BRITISH AMERICAN TOBACCO (INVESTMENTS) LIMITED, London (GB); TOBACCO RESEARCH AND DEVELOPMENT INSTITUTE (PROPRIETARY) LIMITED, Stellenbosch (ZA)

(72) Inventors: Andrew Jonathan Bray, London (GB); Gerhard Le Roux, Stellenbosch (ZA)

(73) Assignees: BRITISH AMERICAN TOBACCO (INVESTMENTS) LIMITED, London (GB); TOBACCO RESEARCH AND DEVELOPMENT INSTITUTE (PROPRIETARY) LIMITED, Stellenbosch (ZA)

( * ) Notice: This patent is subject to a terminal disclaimer.

(21) Appl. No.: 17/890,303

(22) Filed: Aug. 18, 2022

Related U.S. Patent Documents

Reissue of:
(64) Patent No.: 10,772,351
Issued: Sep. 15, 2020
Appl. No.: 14/649,427
PCT Filed: Dec. 6, 2013
PCT No.: PCT/GB2013/053224
§ 371 (c)(1),
(2) Date: Jun. 3, 2015
PCT Pub. No.: WO2014/087170
PCT Pub. Date: Jun. 12, 2014

(30) Foreign Application Priority Data

Dec. 6, 2012 (GB) ..... 1222005

(51) Int. Cl.
*A24C 5/47* (2006.01)
*A24C 5/10* (2006.01)

(52) U.S. Cl.
CPC ..... *A24C 5/475* (2013.01); *A24C 5/10* (2013.01); *A24C 5/47* (2013.01)

(58) Field of Classification Search
CPC .... A24C 5/00; A24C 5/10; A24C 5/47; A24C 5/475; A24D 3/00
See application file for complete search history.

(56) References Cited

U.S. PATENT DOCUMENTS 2,821,200 A 1/1958 Kurt
3,878,982 A 4/1975 Hoffman
(Continued)

FOREIGN PATENT DOCUMENTS

CN 202407050 9/2012
CN 202407050 U 9/2012
(Continued)

OTHER PUBLICATIONS

Anonymous, "Principles and Application of Operating System"; Editor in Chief: Zhao Dequn; Beijing University of Posts and Telecommunication Press 2012.5; ISBN 978-7-5635-3027-4; 3 pages.
(Continued)

*Primary Examiner* — William E Dondero
(74) *Attorney, Agent, or Firm* — CANTOR COLBURN LLP

(57) ABSTRACT

A modular apparatus for smoking article assembly comprises a plurality of modules and a plurality of respective interface units, and a controller to control said plurality of modules via said interface units. The modular apparatus is configured to cause received rods of smokable material to undergo a first sequence of operations. The modular apparatus can be reconfigured so as to cause received rods of smokable material to undergo a second sequence of operations, different to the first sequence of operations. The first and second sequences of operations respectively form at least part of first and second processes for assembling
(Continued)

smoking articles, each smoking article comprising one of said rods of smokable material, which is smoked in use.

41 Claims, 18 Drawing Sheets

(56) References Cited

U.S. PATENT DOCUMENTS

| | | | | |
|---|---|---|---|---|
| 4,527,570 | A | 7/1985 | Porenski | |
| 4,569,359 | A | 2/1986 | Nowers et al. | |
| 4,746,006 | A * | 5/1988 | Nixon | A24C 5/478 131/282 |
| 5,178,166 | A | 1/1993 | Newsome | |
| 5,425,383 | A * | 6/1995 | Garthaffner | A24C 5/475 131/94 |
| 5,695,441 | A * | 12/1997 | Irikura | A24C 5/478 493/47 |
| 6,076,124 | A | 6/2000 | Korowitz et al. | |
| 6,705,325 | B1 | 3/2004 | Hicks | |
| 6,918,867 | B2 | 7/2005 | Scherbarth et al. | |
| 7,004,896 | B2 | 2/2006 | Heitmann et al. | |
| 7,240,783 | B2 | 7/2007 | Draghetti et al. | |
| 7,302,952 | B2 | 12/2007 | Haul | |
| 7,620,471 | B2 | 11/2009 | Li Vigni et al. | |
| 7,702,401 | B2 | 4/2010 | Eryurek et al. | |
| 10,548,344 | B2 * | 2/2020 | Le Roux | A24C 5/475 |
| 2001/0049568 | A1 * | 12/2001 | Focke | A24C 5/00 700/114 |
| 2003/0178037 | A1 * | 9/2003 | Draghetti | A24C 5/00 131/280 |
| 2004/0015383 | A1 | 1/2004 | Rathjen et al. | |
| 2004/0102299 | A1 | 5/2004 | Meyer et al. | |
| 2004/0237972 | A1 | 12/2004 | Horn et al. | |
| 2004/0261801 | A1 | 12/2004 | Horn et al. | |
| 2005/0022830 | A1 | 2/2005 | Dombek et al. | |
| 2005/0062223 | A1 * | 3/2005 | Jendrian | A24C 5/327 271/272 |
| 2005/0209877 | A1 | 9/2005 | Moroney et al. | |
| 2006/0052226 | A1 | 3/2006 | Rinke et al. | |
| 2006/0130858 | A1 * | 6/2006 | Dombek | A24C 5/475 131/281 |
| 2006/0201523 | A1 | 9/2006 | Schlisio et al. | |
| 2006/0213532 | A1 | 9/2006 | Draghetti | |
| 2007/0004573 | A1 | 1/2007 | Wolff et al. | |
| 2007/0017594 | A1 | 1/2007 | Horn | |
| 2007/0144542 | A1 | 6/2007 | Bencivenni et al. | |
| 2009/0145449 | A1 | 6/2009 | Cieslikowski et al. | |
| 2009/0172223 | A1 | 7/2009 | Lee et al. | |
| 2010/0012135 | A1 | 1/2010 | Balletti et al. | |
| 2010/0236561 | A1 * | 9/2010 | Barnes | A24D 3/0216 131/58 |
| 2010/0236893 | A1 | 9/2010 | Riedel et al. | |
| 2011/0011411 | A1 | 1/2011 | Accordino et al. | |
| 2011/0011412 | A1 | 1/2011 | Yanchev et al. | |
| 2012/0241419 | A1 | 9/2012 | Rumsby | |
| 2015/0327592 | A1 | 11/2015 | Bray et al. | |

FOREIGN PATENT DOCUMENTS

| | | | | |
|---|---|---|---|---|
| CN | 202494900 | | 10/2012 | |
| CN | 202494900 | U | 10/2012 | |
| DE | 1006324 | B | 4/1957 | |
| DE | 10155292 | | 5/2003 | |
| DE | 10155292 | A1 | 5/2003 | |
| DE | 102007030275 | | 1/2009 | |
| DE | 102007030275 | A1 | 1/2009 | |
| DE | 102008010659 | | 7/2009 | |
| DE | 102008010659 | B3 | 7/2009 | |
| DE | 102009041319 | | 3/2011 | |
| DE | 102009041319 | A1 | 3/2011 | |
| EP | 0237288 | | 9/1987 | |
| EP | 0237288 | A2 | 9/1987 | |
| EP | 0795277 | A2 | 9/1997 | |
| EP | 0679344 | B1 | 1/2001 | |
| EP | 0726031 | B1 | 5/2001 | |
| EP | 1226765 | | 7/2002 | |
| EP | 1226765 | A2 | 7/2002 | |
| EP | 1228709 | | 8/2002 | |
| EP | 1228709 | A1 | 8/2002 | |
| EP | 1440886 | | 7/2004 | |
| EP | 1440886 | A1 | 7/2004 | |
| EP | 1584247 | | 10/2005 | |
| EP | 1584247 | A1 | 10/2005 | |
| EP | 1704785 | | 9/2006 | |
| EP | 1704785 | A1 | 9/2006 | |
| EP | 1726223 | | 11/2006 | |
| EP | 1726223 | A2 | 11/2006 | |
| EP | 1847186 | | 10/2007 | |
| EP | 1847186 | A1 | 10/2007 | |
| EP | 1847187 | | 10/2007 | |
| EP | 1847187 | A1 | 10/2007 | |
| EP | 1914050 | | 4/2008 | |
| EP | 1914050 | A1 | 4/2008 | |
| EP | 2067414 | A1 | 6/2009 | |
| EP | 20067414 | | 6/2009 | |
| EP | 2227972 | A1 | 9/2010 | |
| EP | 2294934 | | 3/2011 | |
| EP | 2294934 | A2 | 3/2011 | |
| EP | 2540626 | A1 | 1/2013 | |
| GB | 1319052 | | 5/1973 | |
| GB | 1319052 | A | 5/1973 | |
| GB | 2171886 | A | 10/1986 | |
| JP | 5223938 | B2 | 6/2013 | |
| WO | 200627064 | | 3/2006 | |
| WO | 2006027064 | A1 | 3/2006 | |
| WO | 2008059201 | A1 | 5/2008 | |
| WO | 2010107756 | A1 | 9/2010 | |
| WO | 20100142498 | A1 | 12/2010 | |
| WO | WO-2010142498 | A1 * | 12/2010 | A24C 5/471 |
| WO | WO 2010143034 | A1 * | 12/2010 | A24C 5/471 |
| WO | 201132628 | | 3/2011 | |
| WO | 2011032628 | A1 | 3/2011 | |
| WO | 2011131465 | A1 | 10/2011 | |
| WO | 2011139169 | A1 | 11/2011 | |

OTHER PUBLICATIONS

Anonymous, "World most compact integrated servo motor in size 1500 and 3000 W," Published Nov. 13, 2010; JVL Industri Elektronik A/S; <http://www.jvl.dk/>; 1 page.

Ellis, "Basics of the Servomotor and Drive—Part 1: Basic Magnetics and Motor Control Overview," Published Jul. 22, 2008, EE Times <http://www.eetimes.com/>, 4 pages.

European Patent Office; Communication Pursuant to Rule 114(2) EPC; Feb. 16, 2015; Germany; 6 pages.

European Patent Office; Extended European Patent Search Report; Application No. 141806477-1656/2813152; Feb. 27, 2015; 8 pages.

International Bureau; Communication in Cases for which no Other Form is Applicable; Application No. PCT/GB2013/053224; Feb. 13, 2015; Switzerland; 9 pages.

International Search Authority; Notification of Transmittal of the International Search Report and the Written Opinion; Application No. PCT/EP2012/060366; Apr. 23, 2013; NL; 19 pages.

Ellis, George. "Basics of the Servomotor and Drive—Part 1: Basic Magnetics and Motor Control Overview". Published Jul. 22, 2008. EE Times. <http://www.eetimes.com/>.*

Koerbder. Translation of DE 1006324. Translated May 26, 2017.*

International Search Authority; Notification of Transmittal of the International Search Report and the Written Opinion; dated Apr. 23, 2013; NL.

European Patent Office—International Searching Authority; Notification of Transmittal of the International Search Report and the Written Opinion of the International Searching Authority; dated Sep. 11, 2014; Netherlands dated Sep. 11, 2014.

* cited by examiner

RELATING TO SMOKING ARTICLE ASSEMBLY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS REFERENCE TO RELATED APPLICATIONS*

*This application is a Reissue Application of U.S. Pat. No. 10,772,351, issued Sep. 15, 2020, having Ser. No. 14/649,427, filed Jun. 3, 2015, which is a National Stage of International Application No. PCT/GB2013/053224, filed Dec. 6, 2013, which claims the benefit of Great Britain Provisional Application No. 1222005.9, filed Dec. 6, 2012, each of which are incorporated herein by reference in their entirety.*

FIELD

This invention relates to smoking article assembly and associated machinery. In particular, but not exclusively, it relates to a cigarette assembling machine comprising a plurality of modules.

BACKGROUND

Known filter cigarette assembling machines comprise a filter attachment unit for attaching a filter and tobacco rod to form a filter cigarette. In a known filter attachment unit, a "double length" filter rod (also called a "2-up" rod) is aligned with two tobacco rods at either end, and the three rods are wrapped with a wrapper known as a "tipping paper" so as to join them together. The centrally positioned 2-up filter rod is then cut into two so as to form two filter cigarettes. This process is well known per se to those skilled in the art.

Known filter rods and tobacco rods are conveyed in a filter attachment unit by a plurality of cylindrical drums, with rod articles passing from drum to drum as they are conveyed through the unit. Known drums have a plurality of grooves for holding rod articles during transport, the grooves being spaced around the curved periphery of a drum, with each groove extending in the direction of the drum axis.

Certain drums are configured so that particular operations are carried out as the rod articles are conveyed by the drum. For example known filter attachment machines include a swash plate drum for longitudinally compressing two tobacco rods and a 2-up filter rod before tipping paper is applied, and a rolling drum which co-operates with a roll hand to wrap a tipping paper segment around the three rods. Other known drums include cutting drums which cooperate with a cutting knife to cut rod articles, separating drums for separating rod articles, inspection drums to inspect for the presence of filters or to carry out a leakage test, laser drums to burn small perforations in filter rods, and turning drums to change the orientation of cigarettes. Other known drums include transfer drums (also referred to as "intermediate drums"), takeover drums and feed drums. Known filter attachment machines also include a tipper unit for supplying individual cut segments of tipping paper (known as tipping "patches") and a glue unit for applying glue to the tipping paper.

Known filter attachment units also include a machine controller which controls the drums of the unit. Such controllers can control the acceleration, deceleration and speed of drums and the registration of the rotational position of drums relative to one another, and can also carry out self-diagnosis on the drums.

SUMMARY

In accordance with various embodiments of the present invention, a modular apparatus for smoking article assembly is provided. The modular apparatus is configured to receive rods of smokable material and to cause said received rods of smokable material to undergo a first sequence of operations, wherein the modular apparatus can be reconfigured so as to cause received rods of smokable material to undergo a second sequence of operations, different to the first sequence of operations, wherein the first and second sequences of operations respectively form at least part of first and second processes for assembling smoking articles, each smoking article comprising a said rod of smokable material, which is smoked in use.

The modular apparatus comprises a plurality of modules. Two or more of the modules may be of different types and may have different functions to one another.

In a first configuration, the modular apparatus may comprise a plurality of modules having different functions and may thereby be configured to carry out the first sequence of operations.

The modular apparatus may be reconfigured into a second configuration in which the modular apparatus comprises a plurality of modules having different functions and in which the modular apparatus is configured to carry out the second sequence of operations.

In some examples, all of the modules of the first configuration are of different types to one another. In some examples, all of the modules of the second configuration are of different types to one another.

In various embodiments, the modular apparatus includes a controller configured to control the modules. The controller may comprise a logic controller, e.g: a servo controller with programmable logic control (PLC) functionality.

In various embodiments, the controller is configured to control modules of the modular apparatus in the first configuration and in the second configuration.

In embodiments, the controller is a generic controller. A generic controller is a controller which can control any number of modules up to a module limit for the controller, in any desired module combination.

In various embodiments of the invention, two or more modules of the modular apparatus comprise respective interface units. The controller is configured to control the modules via the interface units. The interface unit of a module comprises input/output electronics to mediate communication between the module and the controller. In some implementations, each of the modules of the modular apparatus comprises a respective interface unit.

In some implementations, each module having an interface unit has one or more drums which can be controlled by the controller via the interface unit. In some implementations, the controller controls a plurality of drums of the module via the interface unit. The controller may control the drums individually, or as a group. The controller may control the acceleration, deceleration and speed of the drums, and the registration of the rotational position of drums relative to one another. In some implementations, the controller controls all of the drums of the module.

In some implementations, each drum of each module has a respective drive mechanism to drive the drum. Each drive mechanism is controlled by the controller via the interface unit for the corresponding module. The drive mechanism for each drum may comprise an integrated servo drive.

In some implementations, the controller may alternatively or in addition carry out suitable self-diagnosis on one or more drums of one or more modules via one or more respective interface units. Self-diagnosis of drums by drum controllers is known per se to those skilled in the art and will not be described here.

In some implementations, the modules receive electrical power from the controller via the interface units.

As will be understood from the foregoing, according to various embodiments, the present invention provides a modular apparatus comprising a plurality of modules, the modular apparatus having a control arrangement comprising a controller and a plurality of interface unit, wherein said plurality of modules are controlled by the main controller via the interface units.

If a new module is added the modular assembly, the interface unit of the new module is connected to the main controller. Similarly, if a module is replaced with a module of a different type, the interface unit of the module to be replaced is disconnected from the controller and the interface unit of the new module is connected In this way, the modular apparatus can be reconfigured without the need to replace or extensively reconfigure the control arrangement, while maintaining central control of the modules. Thus, the control arrangement facilitates flexible reconfiguration of the modular apparatus.

The control arrangement may comprise a single controller. Each module may have a single interface unit.

In various embodiments, each module of the modular apparatus comprises a separate base unit. The base units of the modules are separable from one another to allow for alternative module arrangements. In this way, the modular apparatus is configured so that modules can be added and/or removed and so that modules can be rearranged relative to one another.

In some embodiments, the modular apparatus includes three modules. In some embodiments, the modular apparatus includes eight modules. In some embodiments, the modular apparatus includes nine modules.

The modular apparatus may comprise a first rod inserter configured to insert a first rod article between two tobacco rods, a first rod divider configured to divide the first rod article into two segments, a rod separator configured to separate a first group comprising a rod of smokable material and one of said segments from a second group comprising a rod of smokable material and another of said segments, and a second rod inserter configured to insert a second rod article between the first and second groups.

According to embodiments of the invention, a flexibly configurable smoking article assembly apparatus is provided which facilitates changes in the assembly process.

The flexibly configurable apparatus may also provide a useful tool in product development. Rather than designing and building a dedicated machine for carrying out a particular sequence of assembly operations, the modular apparatus may be configured to carry out the sequence. Thus, the time and cost to develop new products may be reduced.

Some of the operations of the first sequence of operations may be included in the second sequence of operations. In some examples, the first and second sequences may differ by only one operation. Alternatively, the second sequence of operations may include all of the operations of the first sequence, and may differ in that the second sequence includes one or more further operations not included in the first sequence. Alternatively, the first and second sequences may each consist of the same operations, arranged in a different order. For example, the first and second sequences may differ in that the position of two operations in the first sequence is interchanged in the second sequence. Alternatively, in some examples, none of the operations in the first sequence may be included in the second sequence.

The modular apparatus may comprise a first module comprising said first inserter and a second module comprising said second inserter.

The modular apparatus may further comprise a second rod divider configured to divide the second rod article into two segments. The modular apparatus may further comprise a wrapping station configured to wrap a wrapper at least partially around an inserted rod article after the inserted rod article is inserted between the two tobacco rods and before the inserted rod article is divided by a rod divider. The said inserted rod article may comprise said first rod article inserted by said first inserter, or said second rod article inserted by said second inserter.

The modular apparatus may comprise a plurality of rod inserters, each said rod inserter being configured to insert a rod article between two tobacco rods. The modular apparatus may include a plurality of rod dividers, each said rod divider being configured to divide a rod article into two segments. The modular apparatus may include a plurality of wrapping stations, each said wrapping station being configured to wrap a wrapper at least partially around an inserted rod article after the rod article is inserted between two tobacco rods and before the inserted rod article is divided by a rod divider.

Preferably, the first process for assembling smoking article forms a first configuration of smoking article and the second process for assembling smoking articles forms a second configuration of smoking article different to the first configuration.

The modular apparatus may therefore facilitate changes in the type of cigarette produced. Thus, rather than having separate dedicated machines in a factory to produce different types of cigarette, a single flexible machine is provided. In this way, floor space in the factory can be saved.

The first and second sequences of operations may cause rods of smokable material to be respectively combined with one or more rod articles such as filter rods.

Preferably each rod of smokable material comprises a tobacco rod.

The modular apparatus may include a plurality of modules. The modules may comprise a plurality of functional units configured to cause said rods of smokable material to undergo said first sequence of operations.

Some functional units may for example comprise a conveying element such as a drum, e.g: a swash plate drum, rolling drum, cutting drum, separating drum or transfer drum. The modules may also include functional units other than drums, for example a tipper unit or glue unit.

The drums are preferably arranged to define a conveyance path through the modular apparatus, along which rods of smokable material are caused to undergo said first sequence of operations.

Reconfiguring the modular apparatus may comprise repositioning modules relative to one another. Alternatively, or in addition, one or more further modules may be added. Alternatively, or in addition, one or more of the modules may be removed.

In some cases where manufacture of a desired cigarette configuration is required, this may be achieved by adding only one further module to the modular apparatus, or by replacing only one module with another module.

The modules may include one or more reconfigurable modules. Reconfiguration of the modular apparatus may comprise reconfiguring a reconfigurable module.

When reconfigured, the modular apparatus preferably comprises a plurality of modules, said plurality of modules comprising a plurality of functional units (e.g: drums) configured to define a conveyance path and cause rods of smokable material to undergo said second sequence of operations.

Preferably, modules are arranged in a row to cause said rods of smokable material to undergo said first and second sequences of operations. Preferably, the modules are arranged in a row by being arranged in a straight line. However, optionally, the modules may be arranged in a row by being arranged in a curved line.

At least one module may be left unchanged when the modular apparatus is reconfigured for said second sequence of operations. For example, an in-feed module configured to receive rods of smokable material may be configured in the same position and in the same way before and after reconfiguration of the modular apparatus.

The modular apparatus may comprise a first group-forming apparatus configured to associate a rod of smokable material with a first rod article to form a first group, and a second group-forming apparatus configured to associate a second rod article with the first group to form a second group. The first group-forming apparatus may be included in a first module and the second group-forming apparatus may be included in a second module.

The modular apparatus may include one or more modules which are linked to a rod attachment unit. Suitable rod attachment units may for example comprise one of a "Max S" unit from Hauni Maschinenbau, a "Max 90" unit, also from Hauni Maschinenbau, or a GD AF12 unit. Other suitable rod attachment units include M5 or M8 filter tip attachment units from Hauni, the GD 121 filter attachment unit, or similar machines. Those skilled in the art will appreciate that other rod attachment units could alternatively be used.

One or more of said rod inserters may be included in the rod attachment unit. The rod attachment unit may be configured to receive at least a tobacco rod from a module of the the modular apparatus, directly or indirectly, and to couple a rod article to the tobacco rod to form a smoking article.

According to various embodiments, a smoking article assembling apparatus comprising one or more modules of the modular apparatus is provided.

The smoking article assembling apparatus may comprise a tobacco rod source. The tobacco rod source may comprise a tobacco rod making unit. Alternatively, the tobacco rod source may comprise a tobacco rod hopper. The modular apparatus may be arranged to receive tobacco rods from the tobacco rod source, directly or indirectly.

At least one of the modules of the modular apparatus may be a reconfigurable module comprising a base unit configured to removably receive a plurality of different parts. The module may comprise a drum-receiving portion adapted to selectively receive first and second drums. The module may comprise a suction control element configured to apply suction to either the first or second drum.

The modular apparatus may comprise some modules which are each configured to receive the same number of drums positioned in the same way. There may be two or more of such modules (e.g: two or more reconfigurable modules). Although the number of drums and their position may be the same for these modules, the drums may be of different types depending on the desired configuration of the modules, so that the functionalities of similarly positioned drums may be different for different modules. In embodiments, all of the modules of the modular apparatus may be configured to receive the same number of drums, positioned in the same way, with the exception of an initial infeed module, which may have a different number of drums.

Each module may comprise a base unit and two or more drums. One or more of the modules may have four drums, or alternatively less than four drums. One or more modules may have more than four drums.

The present invention also provides a kit of parts to assemble the modular apparatus. The kit of parts preferably comprises a plurality of modules.

The present invention also provides a method of reconfiguring the modular apparatus, comprising repositioning modules relative to one another and/or removing one or more modules and/or adding one or more modules and/or reconfiguring one or more of the modules.

The invention also provides an assembler to assemble a smoking article by coupling one or more rod articles to a rod of smokable material which is smoked in use, comprising a first wrapping station to apply a first wrapper to the smoking article and a second wrapping station to apply a second wrapper to the smoking article after the first wrapper has been applied.

A first module may comprise the first wrapping station and a second module may comprise the second wrapping station.

As used herein the term "rod article" includes rods of smokable material such as tobacco rods, filter rods, and also other rod-like articles suitable for inclusion in a smoking article. A rod article may be formed of a single rod, or alternatively may comprise two or more segments.

As used herein the term "filter rod" refers to a rod comprising material suitable for removing certain elements from smoke. The filter rod may be longer than filter elements of the eventual cigarettes. For example, the filter rod may be a "2-up" or "4-up" rod, which is divided into segments during cigarette assembly, each segment being coupled with one tobacco rod in the eventual cigarette. As is known in the art, "2-up filter rod" refers to a filter rod which is intended to be divided into two segments and "4-up filter rod" refers to a filter rod which is intended to be divided into four segments. Similarly, "6-up filter rod" refers to a filter rod which is intended to be divided into six segments.

As used herein, the term "smoking article" includes smokable products such as cigarettes, cigars and cigarillos whether based on tobacco, tobacco derivatives, expanded tobacco, reconstituted tobacco or tobacco substitutes and also heat-not-burn products. The smoking article may be provided with a filter for the gaseous flow drawn by the smoker.

BRIEF DESCRIPTION OF THE DRAWINGS

In order that the invention may be more fully understood, embodiments thereof will now be described, by way of example only, with reference to the accompanying drawings, in which.

DETAILED DESCRIPTION

Figure 1:
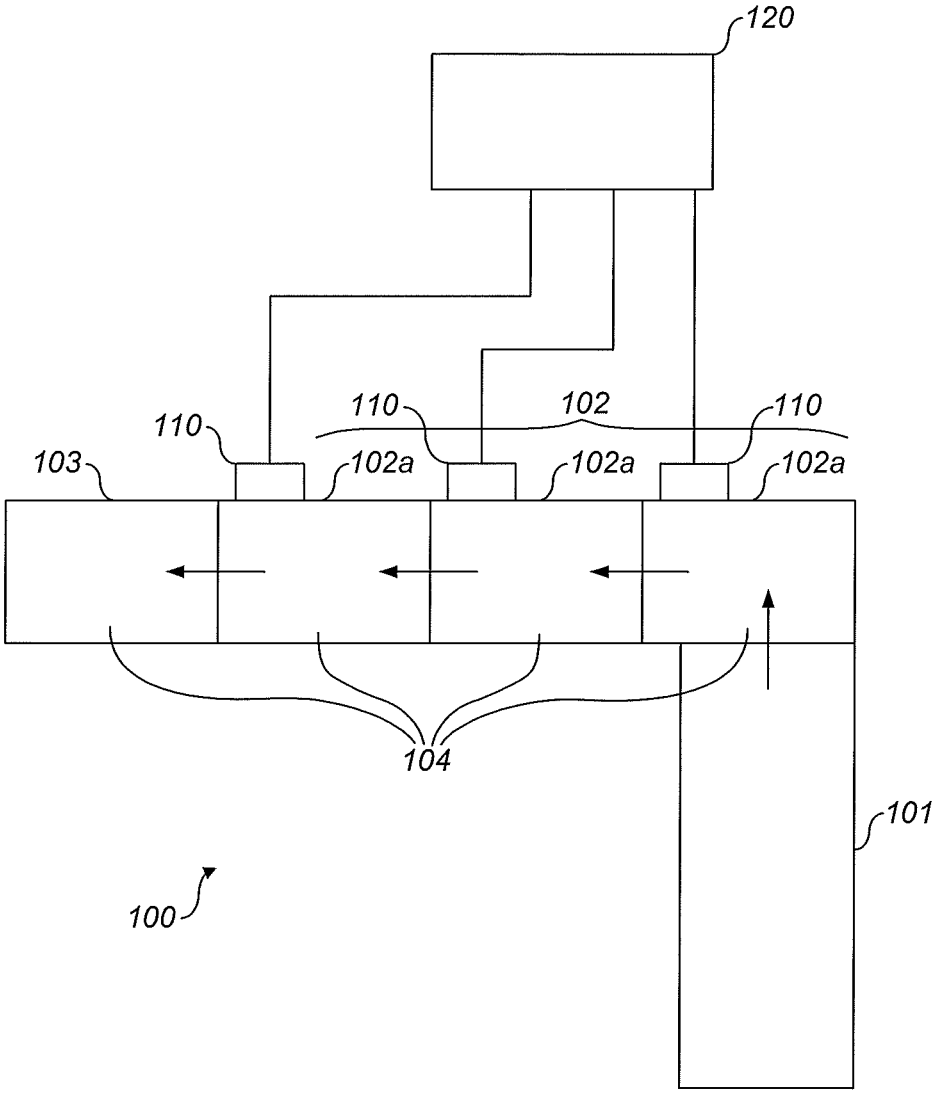
FIG. 1 is a schematic showing elements of a cigarette manufacturing apparatus.

FIG. 1 is a schematic showing elements of a cigarette manufacturing apparatus 100. Apparatus 100 comprises a tobacco rod maker 101 and a cigarette assembly machine 104. As shown, cigarette assembly machine 104 comprises a modular apparatus, which includes a group 102 of modules 102a arranged in row, and a filter attachment unit 103. As shown the modules 102a of FIG. 1 are positioned between tobacco rod maker 101 and filter attachment unit 103, and receive tobacco rods directly from tobacco rod maker 101.

Modules 102 may be configured in different ways to provide different manufacturing options in which different types of cigarette are produced by apparatus 100. Modules 102 may be reconfigured to produce different cigarette types by adding/removing module(s), repositioning modules relative to one another and/or reconfiguring individual modules. In this way, a flexible cigarette assembly machine is provided which facilitates changes in the type of cigarette produced.

The cigarette manufacturing apparatus 100 includes a control arrangement for electrically controlling the modules of the apparatus. The control arrangement comprises a main cabinet 120, which acts as the central controller of the control arrangement. The main cabinet 120 includes a logic controller comprising a servo controller with programmable logic control (PLC) functionality, such as a C600 controller. The main cabinet 120 is configured to control the modules 102a via a plurality of interface units in the form of local cabinets 110.

As shown in FIG. 1, each module 102a has a respective local cabinet 110 in electrical communication with the main cabinet 120. Each local cabinet 120 comprises input/output electronics to mediate communication between the main cabinet 120 and the module 102a. Each local cabinet 110 is connected to the main cabinet 120 by one or more cables.

According to various embodiments, each module 102a comprises a number of servo drive motors to drive components of the module, which are controlled by the main cabinet 120 via the local cabinets 110. The electronics to drive each servo motor may be provided away from the main cabinet and may be provided on the servo motor itself. Consequently, the controller 120 may comprise a generic controller, which means that it can control any number of modules (up to a module limit for the controller), in any desired module combination.

If a new module is to be added to the group 102, the new module is positioned appropriately and the local cabinet of the new module is connected to the main cabinet 120. Similarly, if a module 102a is replaced with a module of a different type, the local cabinet of the module 120a which is to be replaced is disconnected from the main cabinet and the new local cabinet 120a is connected. In this way, the modular apparatus can be reconfigured without the need for replacing or extensively reconfiguring the main cabinet, whilst maintaining central control. Thus, control arrangement of FIG. 1 facilitates flexible reconfiguration of the modular apparatus.

Figure 7:
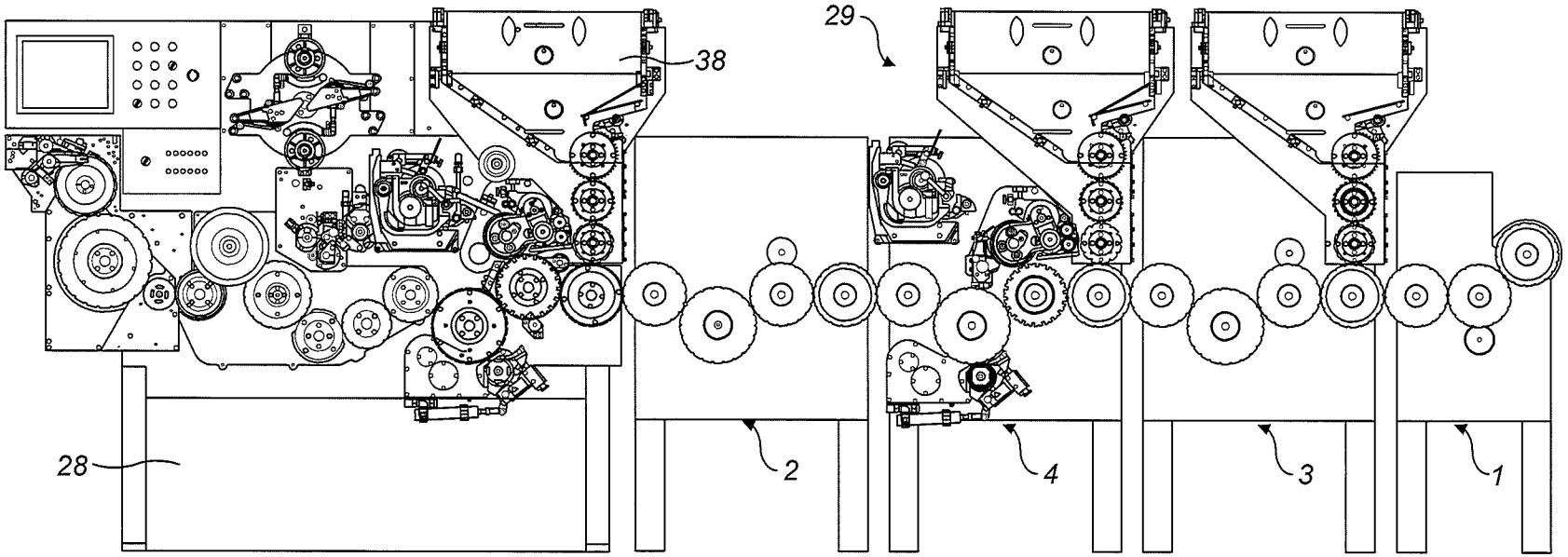
FIG. 7 shows an arrangement of modules linked to the modified Max S unit for making a first type of cigarette.
Figure 8:
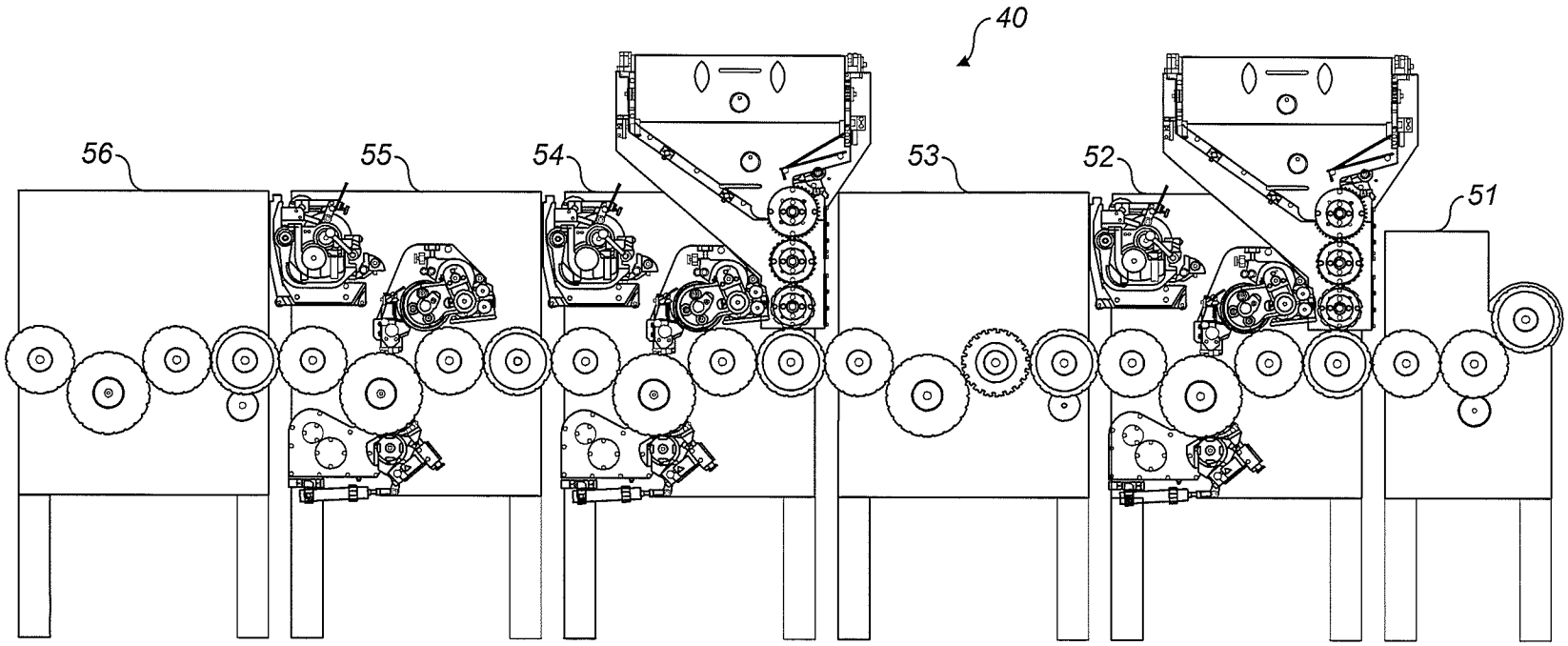
FIG. 8 shows an arrangement of modules for making a second type of cigarette.

FIGS. 1A, 2, 3 and 4 illustrate exemplary modules 1, 2, 3, 4, and FIGS. 7 and 8 illustrate exemplary configurations of the modular apparatus 102, 103. The configuration of FIG. 7 forms cigarettes having triple-segment filters, discussed in more detail below. The configuration of FIG. 8 forms cigarettes having an extendible filter, discussed in more detail below.

Figure 1A:
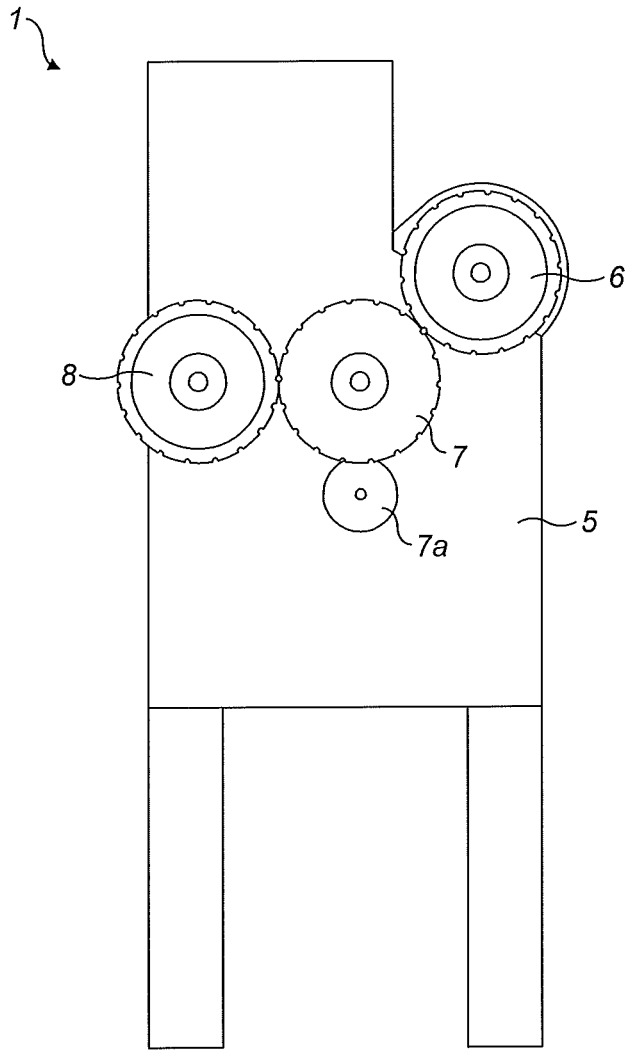
FIG. 1A shows a module of a first type.

FIG. 1A shows a module 1 of a first type. The module 1 comprises a base unit 5, which is fitted with a plurality of drums 6, 7, 8 for conveying rod articles through the module 1. The drums 6, 7, 8 include a takeover drum 6, a cutting drum 7 and a separating drum 8. The takeover drum 6 is configured to receive double-length tobacco rods from a tobacco rod making machine. The tobacco rods are conveyed by the takeover drum and passed to the cutting drum 7. As shown cutting drum 7 has a circular knife 7a configured to cut each double length rod into two tobacco rods, which are fed from the cutting drum to separating drum 8. Separating drum 8 is configured to longitudinally separate the two tobacco rods and then feed them out of the module 1. Separating drum 8 is of a known type having four segments on each side which have cam followers running in a track cam. The segments holding the tobacco rods can move from inner to outer position to create a gap between the tobacco rods. Although not shown in FIG. 1A, the module 1 includes a local cabinet 110 comprising interface electronics configured to allow control of the module drums 6, 7, 8 by the main cabinet 120. In various embodiments, the main cabinet 120 can control the acceleration, deceleration and speed of the drums 6, 7 8 and the registration of the rotational position of the drums relative to one another, and can also carry out self-diagnosis on the drums.

Figure 2:
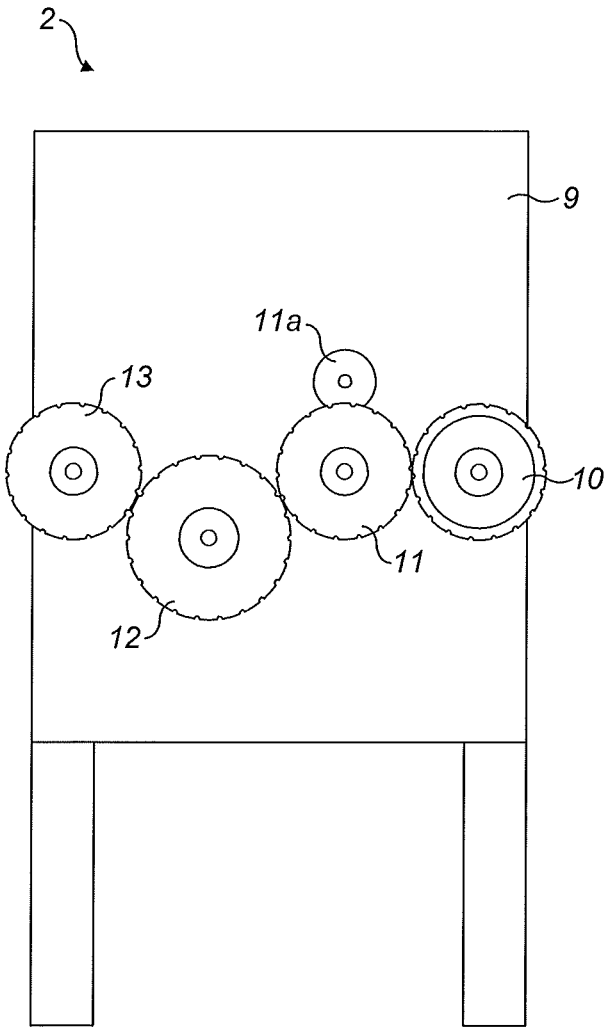
FIG. 2 shows a module of a second type.

FIG. 2 shows a module 2 of a second type. As shown, this module 2 includes a base unit 9, which is fitted with a feed drum 10, a cutting drum 11 and circular knife 11a, an intermediate drum 12 and a separating drum 13. As shown, drums 10, 11, 12, 13 form a conveyance path for rod articles through the module 2.

The module 2 is configured to cut a central rod in a group of received rod articles into two segments, and to then separate the cut segments to form two spaced rod groups.

Figure 2A:
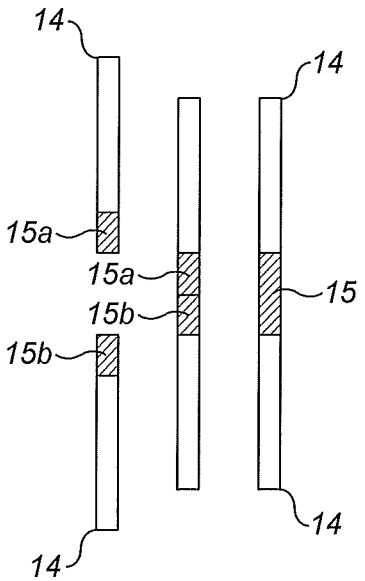
FIG. 2A shows operations performed using the module of FIG. 2.

As illustrated in FIG. 2a, the module 2 may receive two tobacco rods 14 together with a centrally positioned filter rod 15, e.g. from a preceding module, such that the three rods are aligned with one another in a groove of the feed drum 10. In this case, the feed drum 10 conveys the three aligned rods into a groove of cutting drum 11 in which the central filter rod 15 is cut into two segments 15a, 15b. The separating drum 13 then separates the rods into two groups such that each group includes one cut segment 15a, 15b and one tobacco rod 14. Both groups are then fed out of the module 2 by the separating drum 13. Although not shown in FIG. 2, the module 2 includes a local cabinet 110 comprising interface electronics configured to allow control of the module drums 10, 11, 12, 13 by the main controller 120. In various embodiments, the main cabinet 120 can control the acceleration, deceleration and speed of the drums 10, 11, 12, 13 and the registration of the rotational position of the drums relative to one another, and can also carry out self-diagnosis on the drums.

In some exemplary configurations, rather than receiving two tobacco rods together with a single centrally positioned filter rod, the module 2 may alternatively be configured to receive two tobacco rods together with three filter rods positioned centrally between the tobacco rods. In this case, the cutting drum 11 may be configured to cut the central filter rod at a central point into two segments and the separating drum 12 may be configured to separate the rods into two groups such that each group includes one of the cut segments, one rod which has not been cut by the cutting drum 11, and one tobacco rod.

It will be appreciated that in other configurations, the module 2 may receive two tobacco rods together with five filter rods, or another odd number of filter rods. In some examples, the centrally positioned filter rod or rods may be attached to the tobacco rods (and/or one another) with one or more wrappers when received by the module 2.

In some embodiments, some or all of the filter rods may be multi-segment filter rods. Alternatively, the filter rods may be single-segment rods.

Figure 3:
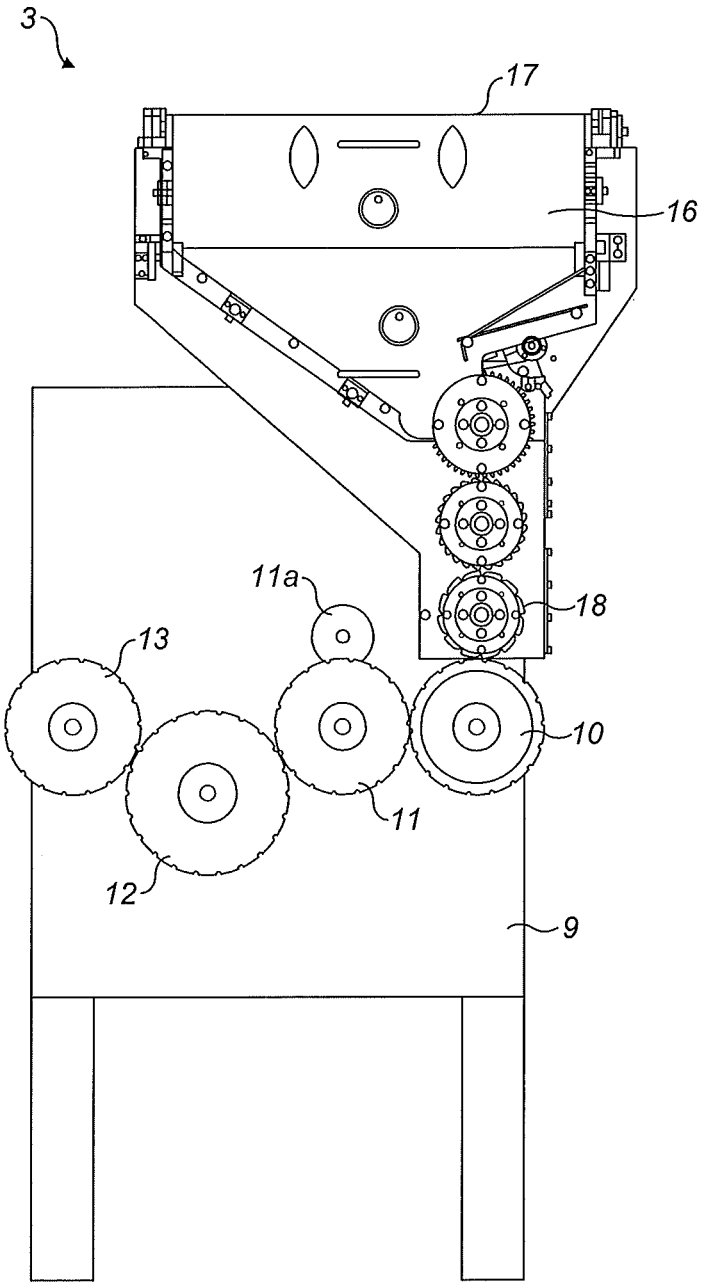
FIG. 3 shows a module of a third type.

FIG. 3 shows a module 3 of a third type. The module 3 of FIG. 3 is the same as the module 2 of FIG. 2, except that the module 3 further comprises a filter feed mechanism 16. Thus, the same reference numerals are retained for corresponding features. The module 3 acts to receive two tobacco rods which are longitudinally separated by a gap, insert a filter rod into the gap, cut the inserted filter rod into two segments and then separate the cut segments to form two spaced rod groups. As with the module 2, the module 3 includes a local cabinet 110. to allow control of the drums 10, 11, 12, 13 by the main cabinet 120.

Suitable filter feed mechanisms 16 for the module 3 are known per se. For example, feed mechanisms from known "Max S" and "Max 90" machines may be used. The filter feed mechanism may be arranged to output a desired type of rod article, for example 2-up, or alternatively 4-up filter rods. As shown in FIG. 3, the feed mechanism 16 has an input 17 for receiving filter rods and an output 18 located for feeding filter rods onto the feed drum 10. The filter feed may also include a cutting mechanism to cut each received rod into filter two rod segments, which are then fed onto the feed drum. For example, the filter feed mechanism may receive 4-up rods, cut each 4-up rod into two 2-up rods and then feed each 2-up rod onto the feed drum. Alternatively, the filter feed mechanism may receive filter rods of a different length, for example 6-up rods, and in some configurations cut the received rods to make segments of a desired length.

Thus, the module 3 may receive tobacco rods from a preceding module, and also filter rods from the feed mechanism 16. The tobacco rods are received on the feed drum spaced by a suitable gap, the gap being sized to receive a rod article from the feed mechanism 16.

Figure 3A:
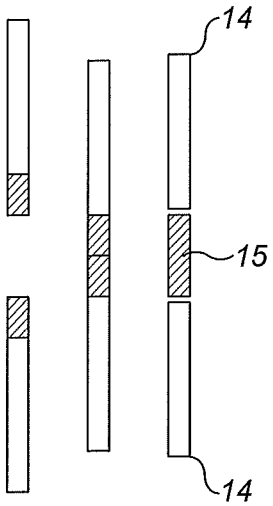
FIG. 3A shows operations performed using the module of FIG. 3.

As illustrated in FIG. 3a, in some configurations, a groove of the feed drum 10 may receive two aligned tobacco rods 14 from a preceding module, the tobacco rods being separated by a gap. The filter feed mechanism may be configured to place a 2-up filter 15 in the gap as the tobacco rods are being conveyed by the feed drum. The cutting drum 11 is configured to cut the inserted filter rod 15 centrally and the separating drum 12 is configured to separate the rods into two groups such that each group includes a filter segment 15a and one tobacco rod 14. The two groups are then fed out of the module 3.

In other configurations, the module 3 may receive two tobacco rods together with two filter rods from a preceding module so that the four rods are aligned in a groove of the feed drum 10. The rod articles may be received with a central gap sized for receiving a further "2-up" filter rod. In this case, the module 4 may be configured to 1) insert a 2-up filter in the gap, 2) cut the inserted filter rod into two rods and then 3) separate the rods into two groups such that each group includes a cut segment of the inserted rod, one of the filter rods received from the previous module, and one of the tobacco rods.

Figure 4:
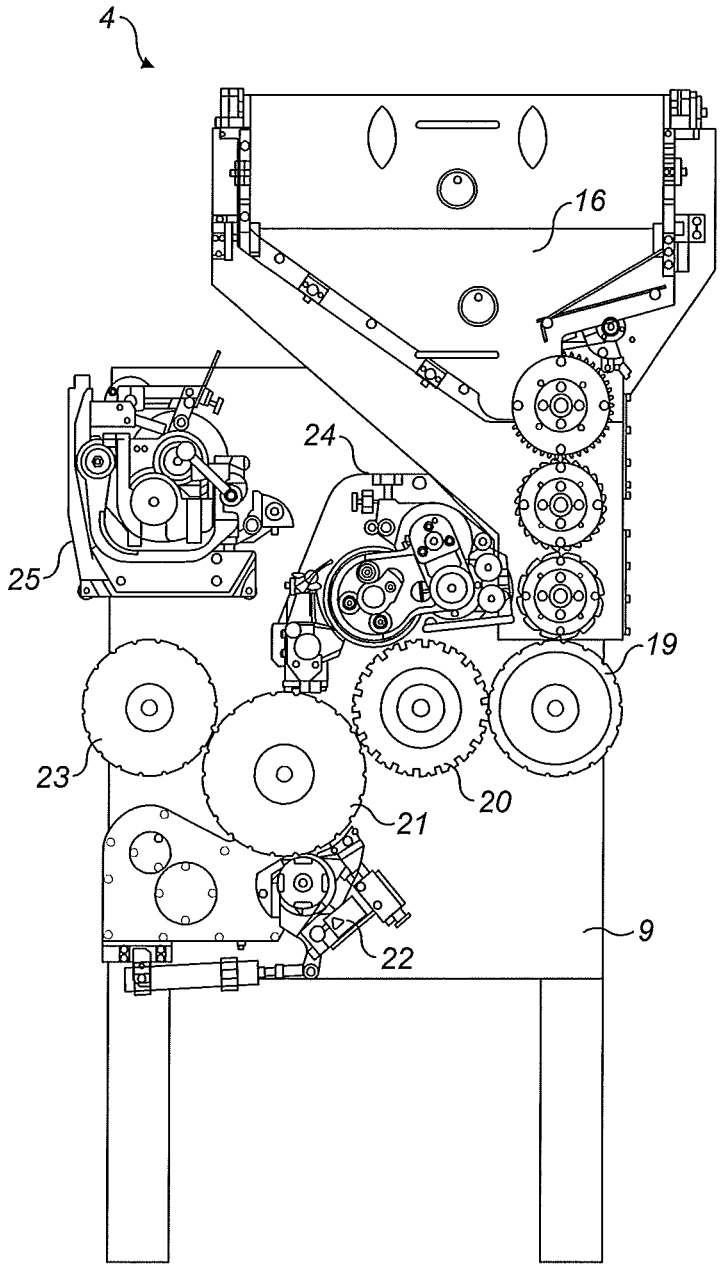
FIG. 4 shows a module of fourth type.

FIG. 4 shows a module 4 of a fourth type. As shown, the module 4 includes a base unit 9, which is fitted with a filter feed 16, a feed drum 19, a swash plate drum 20, a rolling drum 21, a roll hand 22, a transfer drum 23, a tipper unit 24 and a glue unit 25. The module 4 is configured to insert a rod article such as a filter rod between two received tobacco rods, and to apply a wrapper in the form of a tipping paper.

Figure 4A:
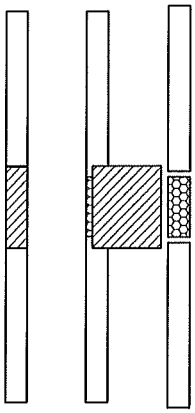
FIG. 4A shows operations performed using the module of FIG. 4.

As illustrated in FIG. 4a, the feed drum 19 may receive two tobacco rods from a preceding module. The tobacco rods may be separated by a gap sized to receive a "2-up" filter rod. The filter feed is arranged to fit a 2-up filter rod into the gap. The swash plate drum 20, rolling drum 21, roll hand 22, tipper unit 24 and glue unit 25 then cooperate to wrap the three rods with a tipping paper to join them together, in a manner which is well known to those skilled in the art. In more detail, the swash plate drum acts to longitudinally compress the three rod articles, and a glue lined patch of tipping paper is then applied on the rolling drum to join the three rod articles together. The joined group of two tobacco rods and one double length filter rod are then fed out of the module 4 by the transfer drum 23.

Although not shown in FIG. 4, the module 4 includes a local cabinet 110 to permit control of the module drums 19, 20, 21, 23 by the main cabinet 120. In various embodiments, the main cabinet 120 can control the acceleration, deceleration and speed of the drums 19, 20, 21, 23 and the registration of the rotational position of the drums relative to one another, and can also carry out self-diagnosis on the drums.

As mentioned above, the tipper unit 24, glue unit 25 and rollhand 22 are well known components per se, but a brief description of these components will nonetheless now be given.

Tipper Unit

The tipper unit 24 has carbide knives cutting against a carbide drum, which cuts the tipping paper to a required length. The tipping patches are then transferred by the carbide drum (tipping drum) onto the cigarettes. The length of the tipping patches is determined by the feed roller which is mounted before the glue unit, and can be varied. The patch length is usually equal to the cigarette circumference plus about 2 mm. The tipper unit can apply patches of different widths depending on the width of the tipping paper used.

Glue Unit

The glue unit 25 includes a glue roller which runs in the glue. This roller then transfers the glue to the transfer roller. The paper runs over the transfer roller to transfer the glue from the roller to the paper.

Rollhand/Rolling Drum

The rollhand 22 is a static curved block which sits below the rolling drum 21. When the cigarettes, which are on the rolling drum, get to the entry point of the roll hand a scraper pushes the cigarette out of the groove and it is then rolled between the drum and roll hand till the cigarette falls into the next groove.

Rather than receiving two spaced tobacco rods, in some configurations the module 4 may receive two tobacco rods together with two filter rods, the rod articles being received from a preceding module. The received filter rods may be separated by a gap sized to receive a further 2-up filter. The feed mechanism 16 may be arranged to insert a 2-up filter into the gap. In this case the swash plate drum acts to compress the five rod articles together and the inserted rod is wrapped with a tipping paper on the rolling drum to join it to the rods received from the previous module.

In some configurations, the module 4 may apply tipping in two separated bands. The configuration for applying banded tipping is the same as for application of conventional tipping, but a slitting knife is also included to split the single tipping band into 2 bands. Also, paper guides are provided to open the two bands to the required positions before gluing. The tipping band is slit after the splicing unit and scraper (not shown), at a position before the glue applicator.

In embodiments, the filter rods which are inserted by the modules 2, 4 may comprise multiple segments, ie: they may comprise multi-segment rods formed for example of a central "double length" rod segment with two "single length" rod segments to either side of the central segment. Alternatively however, in some embodiments the filter rods which are inserted may be single-segment rods.

The modules described above may be linked together in different arrangements to provide different sequences of operations for forming the same or different types of cigarettes. The final drum of one module may be aligned with the initial drum of the next module so that rods pass from the out-feed of one module to the in-feed of the next.

Still further flexibility can be achieved by reconfiguring individual modules. The modules 2, 3 and 4 of FIGS. 2 to 4 share a base unit 9 having four drum-receiving shafts, each adapted for removably receiving a drum. Thus, each of the drums on the modules 2, 3 and 4 may be replaced with another suitable drum so as to vary the functionality of the module. For example, the cutting drum 11 of FIG. 2 can be replaced with a transfer drum or a swash plate drum. The intermediate transfer drum 12 of FIG. 2 can be replaced with a rolling drum, transfer drum, ejection drum, laser drum or other suitable drum. Other components may also be added/removed, for example a filter feed, tipper unit, gluing unit, rolling device and a laser for laser perforation.

The module 2 of the second type can thus be converted to a module 3 of the third type by a reconfiguration process comprising adding a filter feed 16. Furthermore, the module 3 of the third type can be converted to a module 4 of the fourth type by a reconfiguration process comprising replacing the cutting drum 11 with a swash plate drum 20, replacing the intermediate transfer drum 12 with a rolling drum 21, replacing the separating drum 13 with a transfer drum, and adding the tipper unit 24, the glue unit 25 and the roll hand 22.

In replacing a drum on the base unit 9, a replacement drum typically has the same number of grooves as the drum which it replaces. In FIGS. 2, 3, 4, the first drum 10, 19 may have 20 grooves, the second drum 11, 20 may have 20 grooves, the third drum 12, 21 may have 22 grooves and the fourth drum 13, 23 may have 20 grooves.

Figure 9:
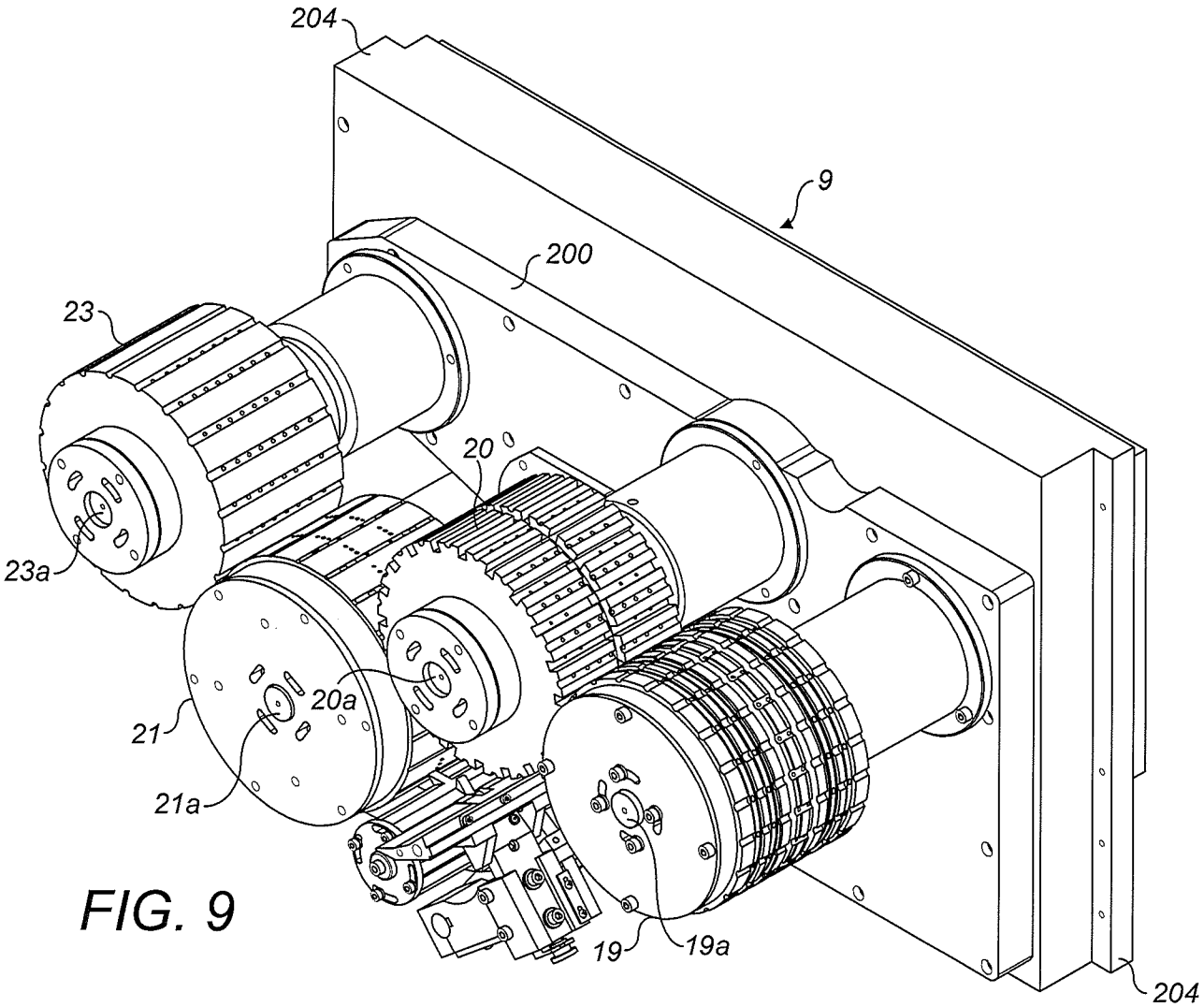
FIG. 9 is a perspective view of the base unit of the modules of FIGS. 2, 3 and 4 mounted with four drums.
Figure 10:
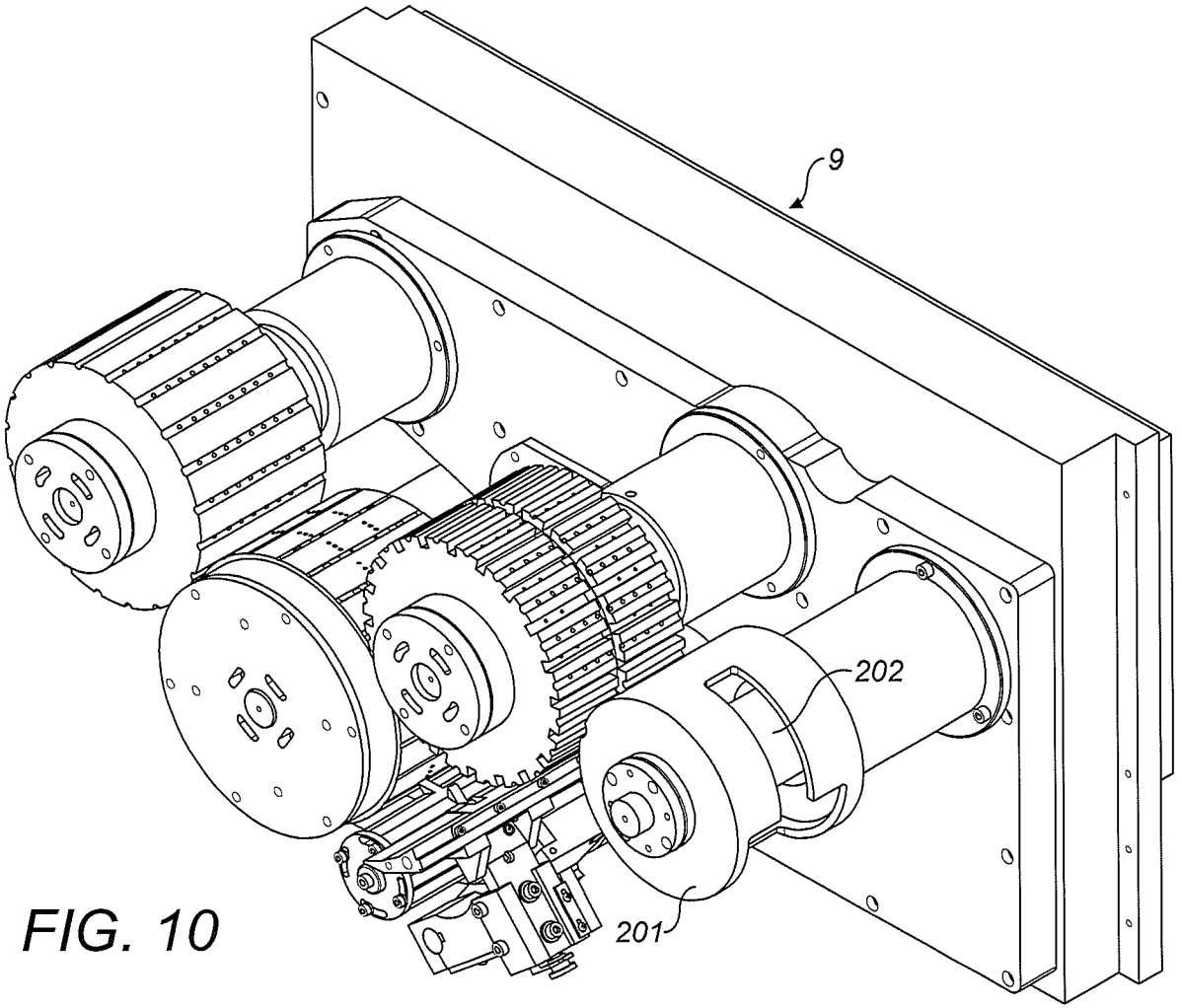
FIG. 10 is the perspective view of FIG. 9, with one drum removed.

FIG. 9 is a perspective view showing the base unit 9 fitted with a feed drum 19, swash plate drum 20, roll drum 21 (and roll hand 22), and transfer drum 23. As shown, each drum 19, 20, 21, 23 is mounted on a shaft 19a, 20a, 21a, 23a which rotates the drum. As illustrated in FIG. 10, each drum can be unscrewed and detached from its shaft so that another drum can be alternatively fitted.

As shown in FIGS. 9 and 10, the base unit 9 include a suction housing 200 which applies suction for holding rod articles on the drums 19, 20, 21, 23 and for transferring rod articles from one drum to the next. Referring to FIG. 10, suction housing 200 is in communication with suction control elements 201, which each have a suction outlet 202 shaped to selectively apply suction to appropriate points during rotation of the corresponding drum.

Figure 11:
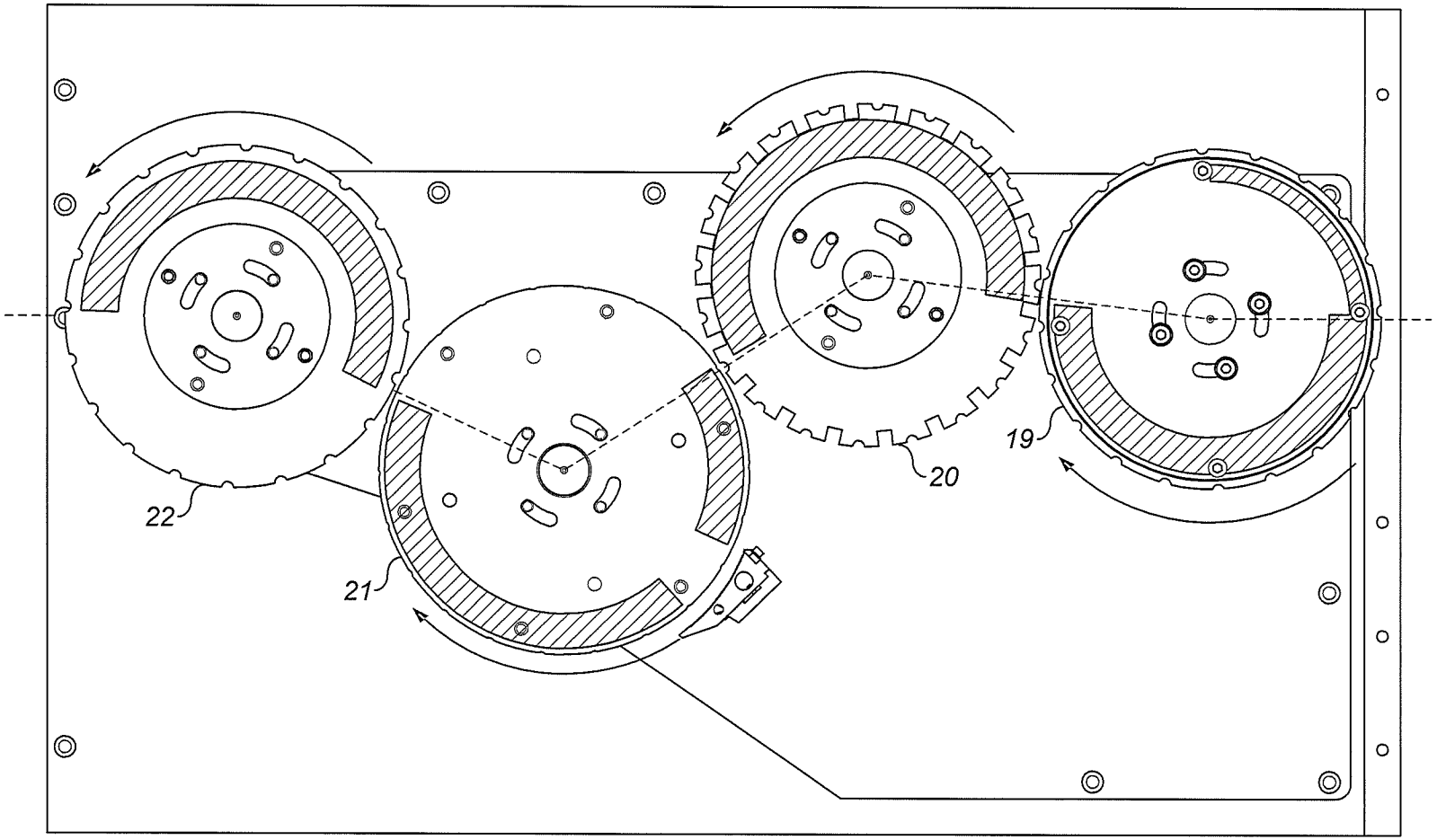
FIG. 11 is a schematic illustrating the regions where suction is applied to the drums, and the direction of rotation of the drums.

FIG. 11 is a schematic which illustrates with shading the regions in which suction is applied by the suction control elements, and the direction of rotation of the drums 19, 20, 21, 23.

Some drums may be replaced without changing the suction control element. For example, the intermediate drum 12 of the module 2 may be replaced by a cutting drum 11 without changing the suction control element. In some cases however the suction element may be changed before a new drum is fitted.

Figure 12:
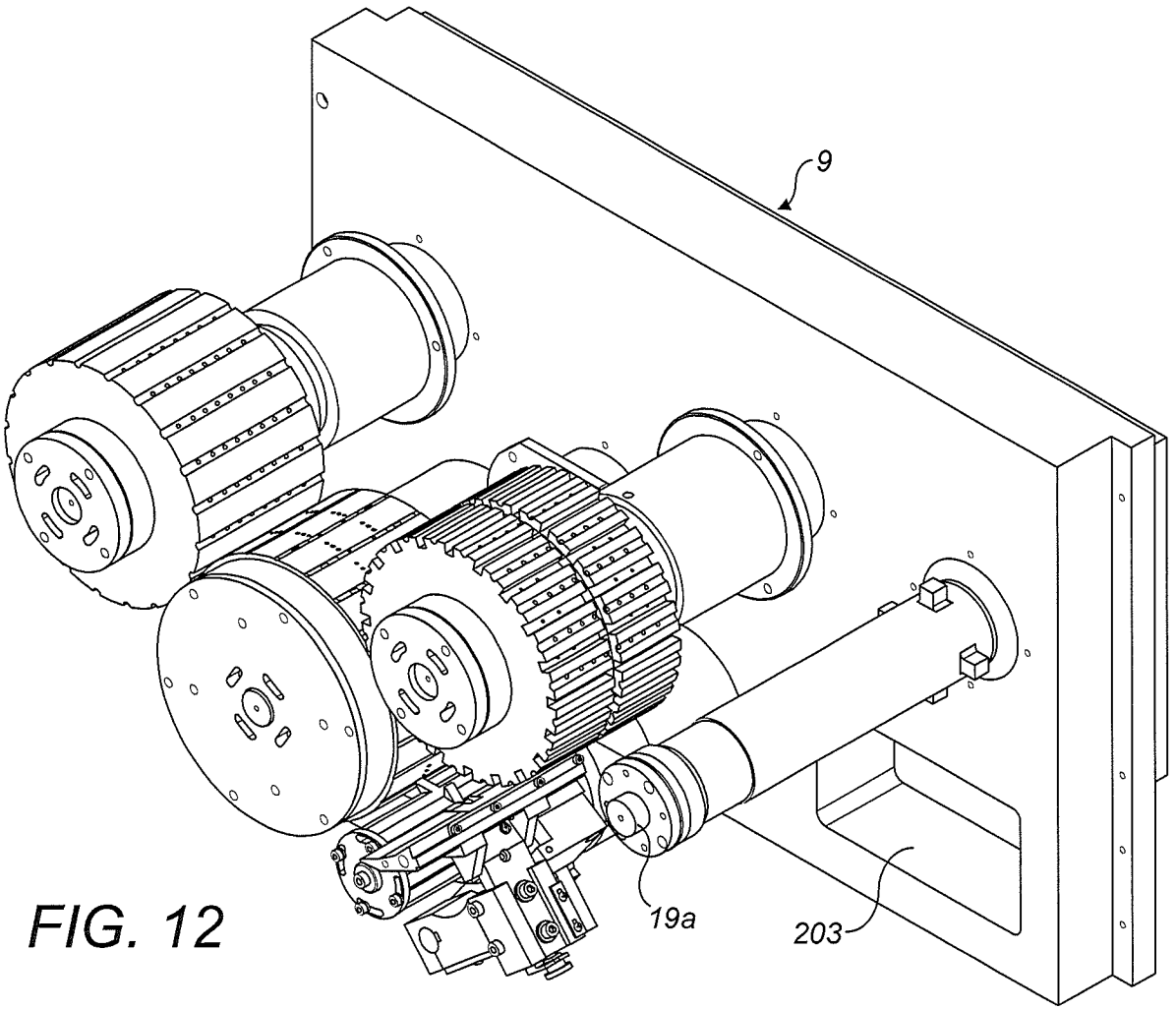
FIG. 12 is the perspective view of FIG. 10 with a suction control element and suction housing removed.

FIG. 12 shows the base unit 9 with drum 19 and its suction control element 201 removed, and with the suction housing 200 also removed. As shown, vacuum may be applied to suction housing 200 via a hole 203 in the base unit 9.

Each drum may be driven by a respective servo drive motor. Those skilled in the art cognizant of the present disclosure will appreciate that the servo motor may be connected to its respective drum by a gearbox and a coupling to turn the drum.

The servo drive motor for each drum is an integrated servo drive. Integrated servo drives are known per se and will not be described in detail. Briefly, in an integrated servo drive, the electronics to drive the motor is integrated with the motor.

The interface electronics of the local cabinet 110 of the module is configured to transfer control signals from the main controller to appropriate servo drive motors to control the module drums. The servo driver motors for each drum may thus be individually controlled by the main cabinet 120 via the interface electronics of the local cabinet 110 of the module. It will be appreciated that the servo drives may also send signals, e.g: status or diagnostic signals back to the main controller.

Figure 13:
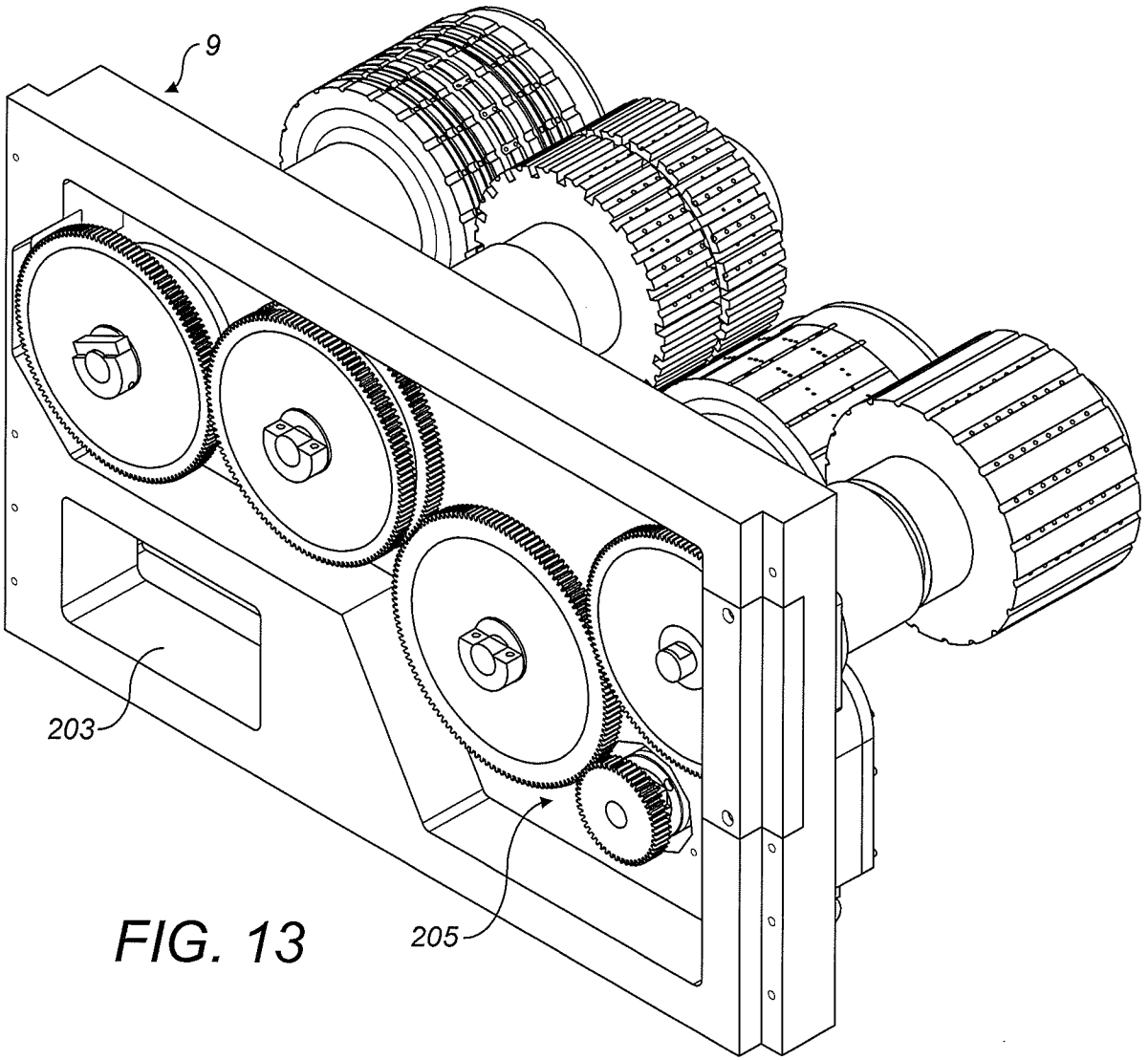
FIG. 13 is view of the base unit of FIG. 9 from behind.

FIG. 13 is a rear view showing an alternative scheme for driving the drums of the base unit 9. As shown, in this example the base unit includes a gearbox 205 configured to turn the four drums synchronously. In use, one of the shafts is driven by a servo motor (not shown) to turn the drums. The servo motor may receive control signals from the main controller 120 via the local cabinet 110 of the module.

Turning again to FIG. 9, as shown the base unit 9 has a joining member 204 at either end to overlap with complementary joining members on other modules. The joining members 204 ensure that the final drum on one module is automatically aligned with the first drum of the next module when two modules are engaged together.

Figure 5:
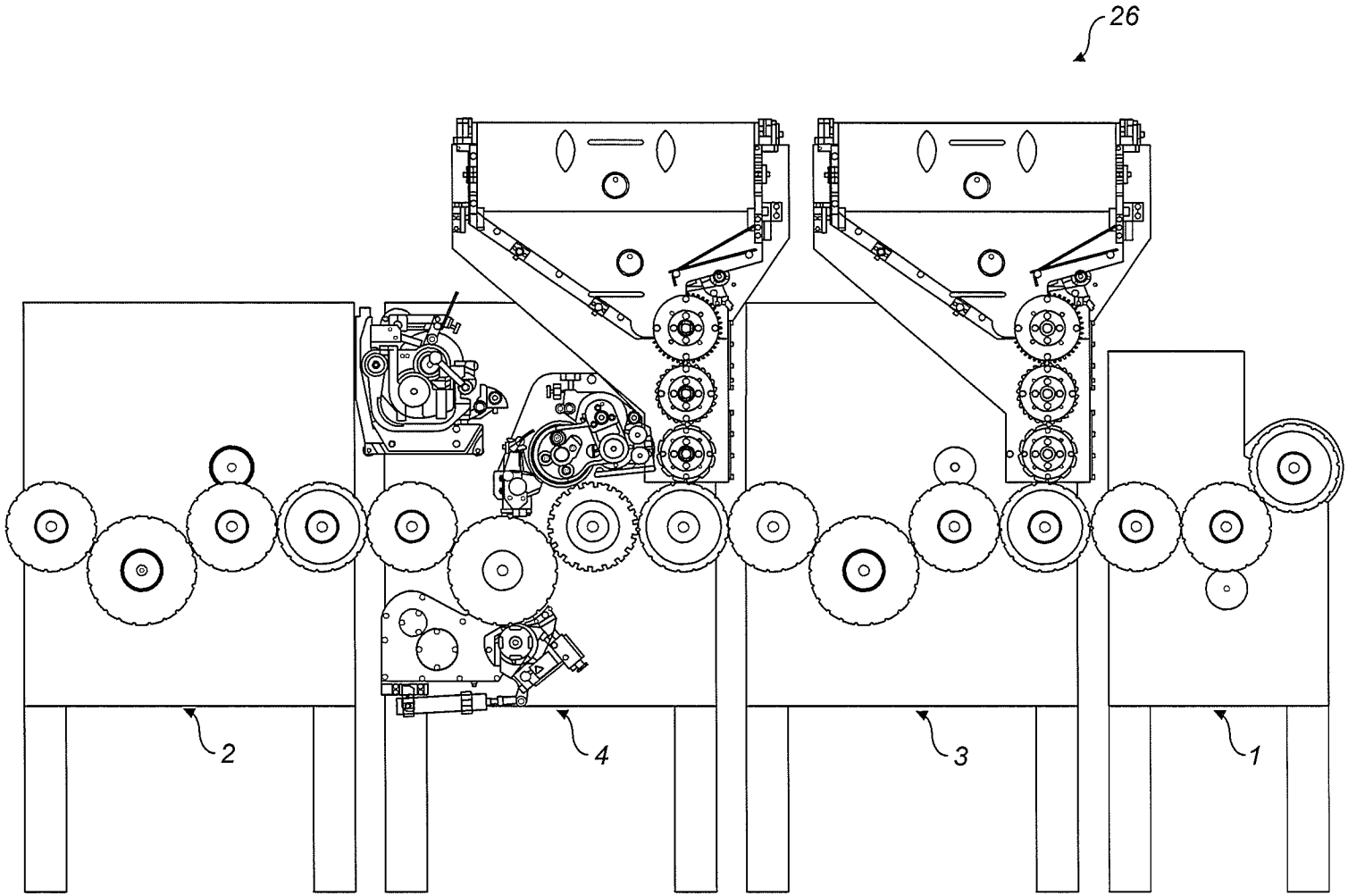
FIG. 5 shows an arrangement of modules.

FIG. 5 shows one possible configuration of modules 26, in which modules 2, 4, 3, 1 of the second, fourth, third and first type are arranged one after the other in a row. As described above, each module may include one or more servo motors to drive the drums. Other components, e.g: tipper unit, glue unit, may be driven by further servo motors. These further servo motors may be controlled by the main cabinet 120 via the local cabinets 110 of the modules, in the same manner in which the servos which drive the drums are controlled.

Those skilled in the art, cognizant of the present disclosure will appreciate that self-diagnosis and safety features of the module components may also be controlled by the main cabinet via the local cabinets.

In some embodiments, the main cabinet also provides electrical power via the local cabinet 110 to power the servo drive motors. In some embodiments, the modules may include one or more sensors, and the electrical output of the sensors may be provided to the main cabinet 120 via the local cabinet 110.

In various embodiments, the local cabinet 110 of each module is connected to the main cabinet 120 by one or more cables. For example, one cable may carry control signals (input/output signals) and another cable may carry electrical power. Those skilled in the art will appreciate that further cables may also be provided for example for 3-phase and Ethernet communication.

According to various embodiments, local cabinets may be easily connected/disconnected from the main cabinet by connecting/disconnecting the respective cables.

In embodiments, the servo motors of each module may be synchronised with one another so that rotation of all of the drums in a particular arrangement is synchronised. Servo motors driving other components may also be appropriately synchronised with the servo modules used to drive the module drums.

Figure 6A:
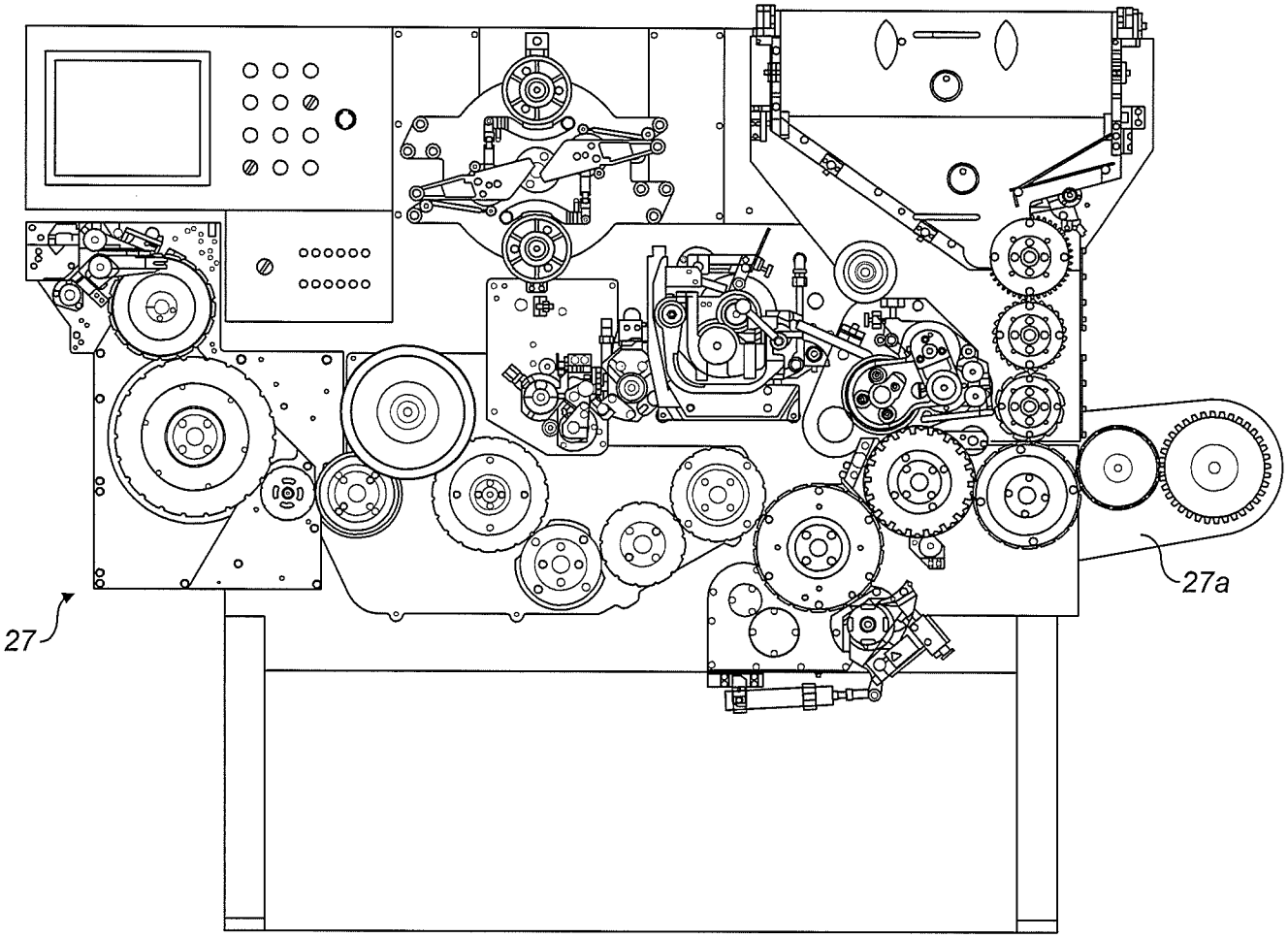
FIG. 6a shows a Max S unit.
Figure 6B:
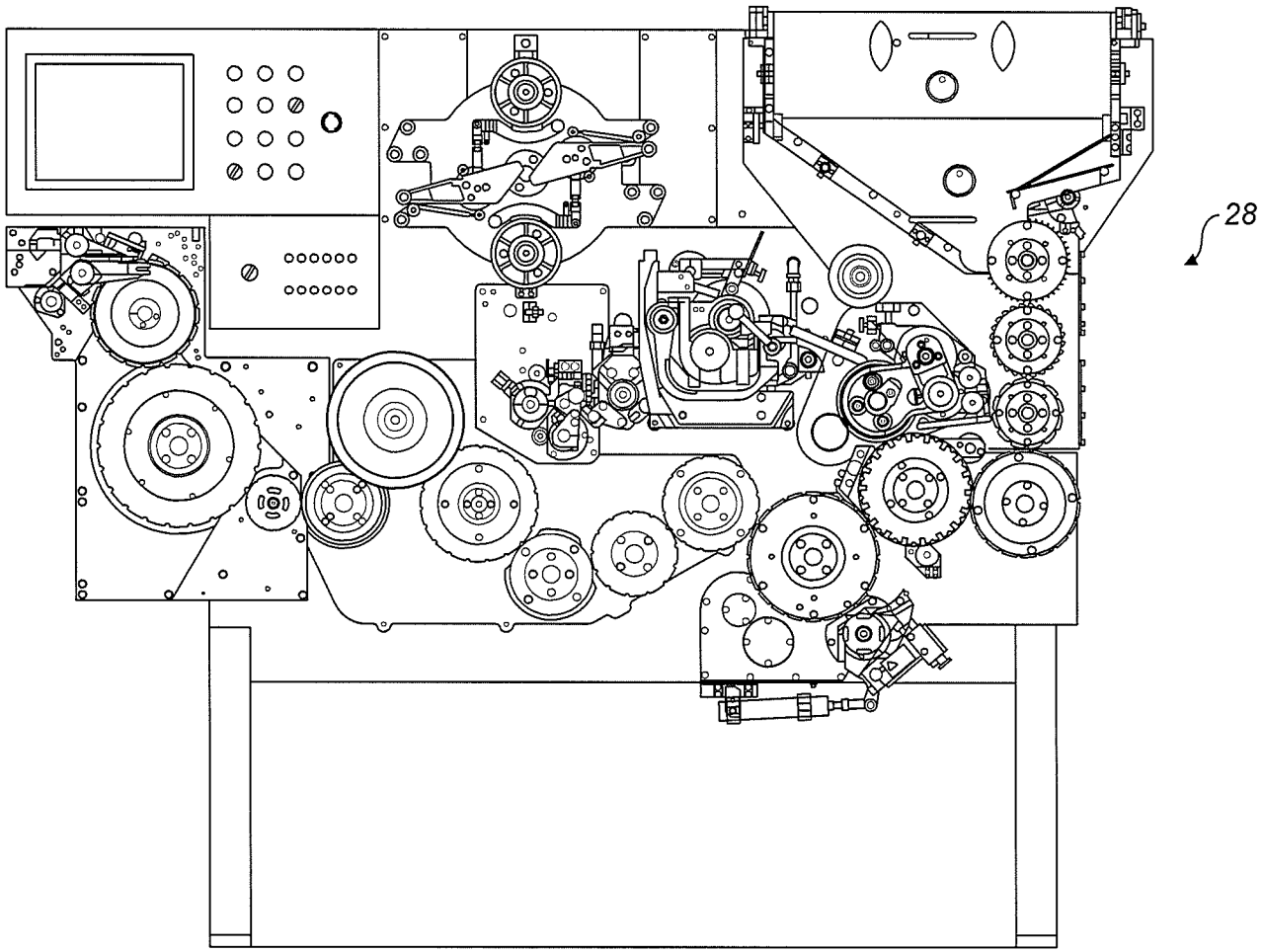
FIG. 6b illustrates a modification to a Max S unit.

The combination of modules 26 may be linked to a filter attachment unit such as a modified Max S unit to carry out further processing. FIG. 6a illustrates a commercially available Max S machine 27 and FIG. 6b illustrates a modified machine 28 adapted for use with the modules 1, 2, 3, 4. As shown, the modified machine 28 of FIG. 6b differs from the known machine 27 only in that the infeed section 27a is removed in the modified machine 28.

Since the modified unit 28 differs from the known unit 27 only by the absence of the infeed unit 27a, it will not be described in any further detail here.

Although FIGS. 6a and 6b show a modified Max S, any filter attachment unit could alternatively be linked to the modules, for example a commercially available machine such as a GD AF12 or a Max 90 unit modified in a similar manner as described above, i.e.: by removing the infeed section. Where a Max 90 is used for example, the modified unit can carry out all of the functions of a Max 90, which include: addition of a filter rod, tipping application and rolling, laser perforation, cutting, turning cigarettes, inspections and a link-up to a tray filler.

Figure 7A:
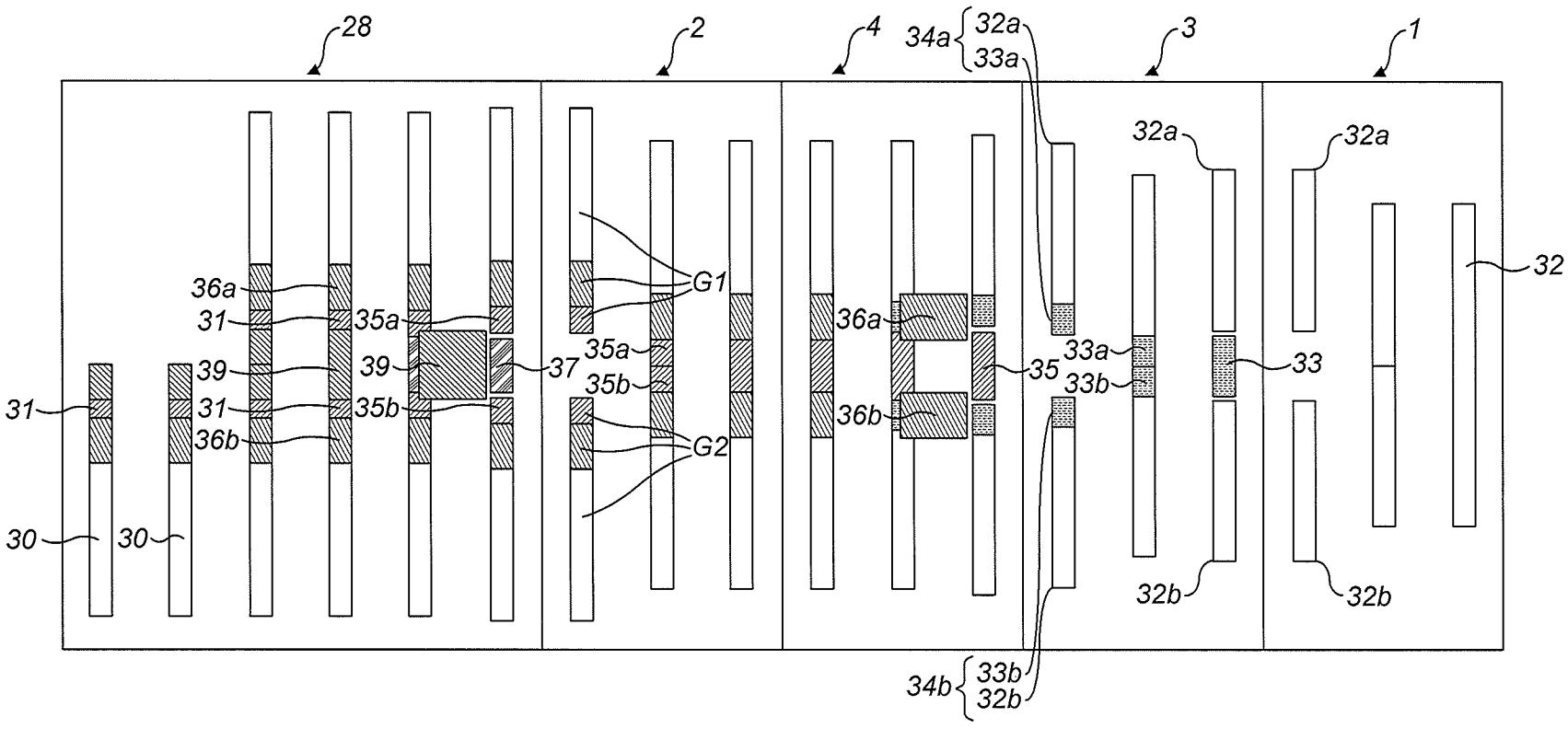
FIG. 7a illustrates the corresponding cigarette assembly process.

FIG. 7 shows an arrangement of successive modules 29 linked to a modified Max S unit 28 for making a particular type of cigarette. As shown, the arrangement 29 includes a module 1 of the first type, a module 3 of the third type, a module 4 of the fourth type and a module 2 of the second type, arranged successively in a row and linked to a modified Max S unit 28. The first module 1 receives a "double length" tobacco rod from a tobacco rod maker (not shown), and the received tobacco rod is caused to undergo a sequence of operations in the modules 1, 3, 4, 2 and subsequently in the Max S unit 28 to form a filter cigarette 30. As shown in FIG. 7a, the eventual cigarette 30 includes a triple segment filter and is wrapped with two separate tipping papers separated longitudinally by a gap 31.

FIG. 7a illustrates the sequence of operations carried out by the machinery of FIG. 7. Each box in FIG. 7a illustrates the operations which occur in one of the modules. As shown, each box is labelled with the reference sign of one of the modules 1, 3, 4, 2 to indicate that the operations illustrated in the box occur in the referenced module.

Referring to FIG. 7a, in the module 1, a "double length" tobacco rod 32 is received from a tobacco rod maker (not shown) and cut into two equal segments 32a, 32b. The two segments are then separated and the separated segments are fed into the next module 3.

In the module 3, a 2-up filter rod 33, supplied by the module's filter feed mechanism, is inserted in the gap between the two separated tobacco rods 32a, 32b received from the module 1. The filter 33 is then cut centrally into two segments 33a, 33b. A first group 34a comprising one tobacco rod 32a and one filter rod segment 33a is then separated from a second group 34b comprising one tobacco rod 32b and one filter rod segment 33b, and the two separated groups 34a, 34b are fed onto the first drum of the next module 4.

In the next module 4, a further filter rod 35 is added in the gap between the two separated groups 34a, 34b. The module 4 then applies tipping in two separated bands 36a, 36b. The first band 36a is wrapped around the tobacco rod 32a, the rod segment 33a and the further rod 35 to join these three rods together. The second band 36b is wrapped around the tobacco rod 32b, the rod segment 33b and the further rod 35 to join these rods together. Thus, filter 35 is joined to a filter segment 33a from the first group 34a and to a segment 33b from the second group 34b by wrapping with the bands 36a, 36b. The wrapped rods 34a, 34b, 33a, 33b, 35 are then fed to the next module.

In the next module 2, the centrally positioned double length filter rod 35 is cut into two segments 35a, 35b. A first group of rods G1 comprising a filter rod segment 33a, a filter rod segment 35a and a tobacco rod 32a is then separated from a second group of rods G2 comprising a filter rod segment 33b, a filter rod segment 35b, and a tobacco rod 32b. The separated groups G1, G2 are then fed to the first drum of the modified Max S machine 28, as shown in FIG. 7.

As illustrated in FIGS. 7 and 7a, the modified Max S unit has a filter feed 38 which inserts a 2-up filter rod 37 between the group G1 and the group G2. The 2-up filter rod 37 is then joined to the filter rod segment 35a of the group G1 and to the filter rod segment 35b of the group G2 by wrapping with a single wrapper 39. The wrapper 39 is sized so that it does not overlap with the bands 36a, 36b. Instead, the wrapper 39 is sized so that there is a gap 31 between each end of the wrapper 39 and the bands 36a, 36b.

The wrapped 2-up filter rod 37 is then cut centrally into two segments 37a, 37b to form two cigarettes 30 which are turned so as to adopt a parallel configuration. As shown, the two cigarettes 30 are identical, and each includes three filter segments 37a, 35a, 33a and two wrappers, the wrappers being longitudinally separated by a gap 31.

FIG. 8 shows an alternative configuration 40 of successive modules for making a different type of cigarette 41. The eventual cigarette 41 is of the extendible (telescopic) type, in which two filters can be separated by a variable amount by sliding an outer sleeve. Telescope cigarettes are known per se, from for example FR 1547656.

As shown, the configuration 40 comprises six modules 51, 52, 53, 54, 55, 56.

The first module 51 is the same as the module 1 of FIG. 1A.

The second module 52 is the same as the module 4 of FIG. 4.

The third module 53 comprises a modified version of the module 2 of FIG. 2. The third module 54 is different to the module 2 of FIG. 2 in that the first drum (feed drum 10) has been replaced with a cutting drum, the second drum (cutting drum 11) has been replaced with a separating drum, and the fourth drum (separating drum 13) has been replaced with an inspection drum to inspect for the presence of filters.

The fourth module 54 is the same as the module 4 shown in FIG. 4.

The fifth module 55 comprises a modification of the module 4 shown in FIG. 4. The module 55 is different to the module 4 in that the filter feed 16 has been removed and in that the fourth drum (transfer drum 23) is replaced with a laser drum to form perforations in the cigarette.

The sixth module 56 is a module comprising four drums 56a, 56b, 56c, 56d. The first drum 56a is a cutting drum, the second drum 56b is a transfer drum, the third drum 56c is a turning drum and the fourth drum 56d is an inspection drum configured to perform a leakage test on the cigarettes. The turning drum is known per se, and may be configured to turn the front row of cigarettes over to have the same orientation as the rear row, or may alternatively be configured to turn the rear row of cigarettes over to have the same orientation as the front row.

A further module may also be provided (not shown) including final end scanners and an ejection drum which serves as a link-up to further downstream machines.

Figure 8A:
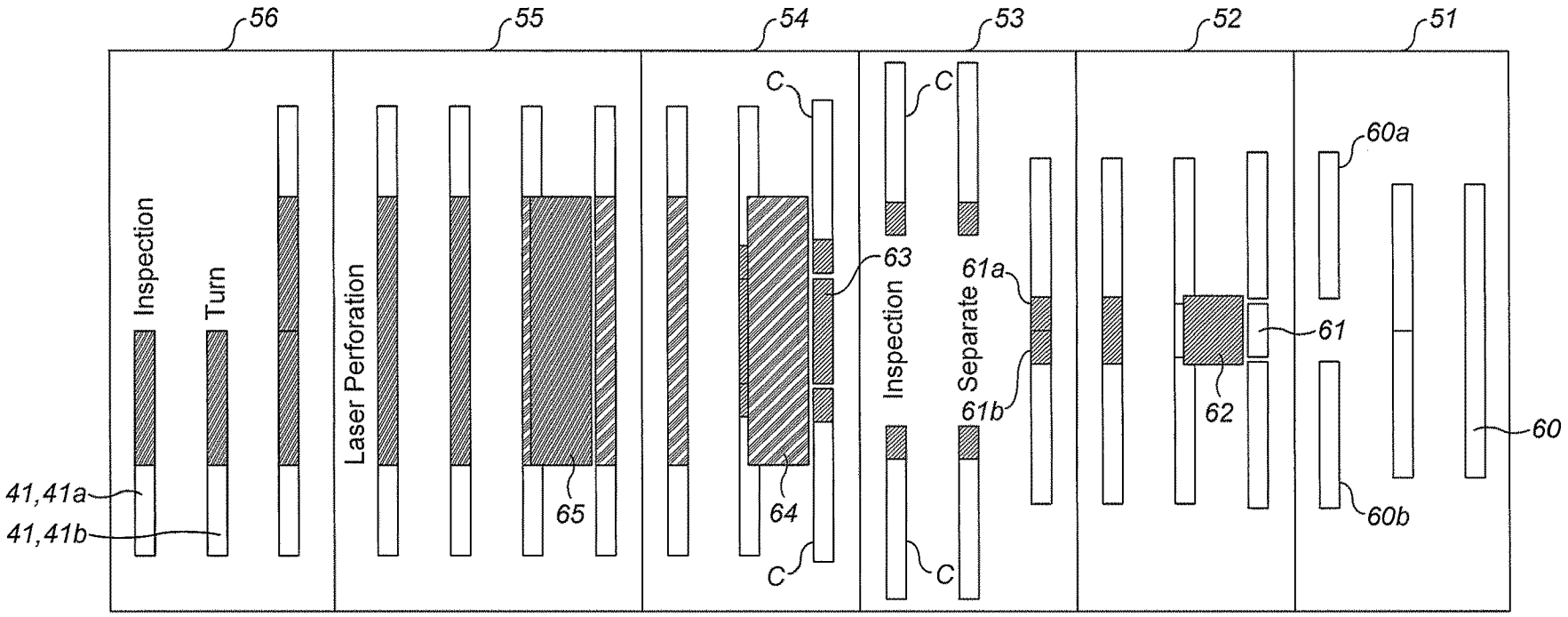
FIG. 8a illustrates the corresponding cigarette assembly process.

FIG. 8a illustrates the sequence of operations carried out the form the cigarette 41. Each box in FIG. 8a illustrates the operations which occur in one of the modules 51, 52, 53, 54, 55, 56. As shown, each box is labelled with the reference sign of one of the modules 51, 52, 53, 54, 55, 56 to indicate that the operations illustrated in the box occur in the referenced module.

As shown, the module 51 is an infeed module configured to receive "double length" tobacco rods 60, for example from a tobacco rod maker. In the module 51, each tobacco rod 60 is cut into two segments 60a, 60b, which are separated and fed into the next module 52.

The next module 52 is configured to insert a 2-up filter rod 61 between the separated tobacco rods received from the module 52, and to wrap the three rods 60a, 60b, 61 with a wrapper 62 to join them together. The wrapped rods are then fed into the next module 53.

The next module 53 is configured to cut the filter rod 61 into two segments 61a, 61b, and to separate the segments to form two groups, each comprising a tobacco rod 60a, 60b joined to a filter rod segment 61a, 61b. Each group forms an inner cigarette C of an eventual extendible cigarette 41. The inspection drum then carries out an inspection for the presence of filters. The separated inner cigarettes C are then fed to the next module 54.

The next module 54 is configured to insert a further filter rod 63 between the filter segments 61a, 61b and to wrap a wide tipping paper patch 64 around the tobacco rods 60a, 60b, the filter rod segments 61a, 61b and the filter rod 63. The glue unit is configured to apply glue to the tipping patch 64 so that the tipping patch 64 is only glued to the centre filter rod 63 and on the overlap of the tipping, so as to form a tube which is only attached to the centre rod 63. The wrapped rods are then fed to the next module 55.

The next module 55 is configured to apply a further tipping patch 65 around the tipping patch 64 so that it overlaps with the tipping patch 64. The laser drum then applies a pulsed beam to make small perforations through the tipping layers 64, 65.

The next module 56 is configured to cut the filter 63, through the tipping layers 64, 65 so as to divide the filter 63 into two segments 63a, 63b and thus form two extendible cigarettes 41a, 41b. The turning drum then turns the two cigarettes 41a, 41b so that they are parallel to one another.

As described above, the inner cigarette C of each extendible cigarette 41a is not glued to the tipping layers 64, 65, so that the inner cigarette C can be slid in the tube formed by the tipping layers 64, 65 to vary the separation between the filter rod 61a, 61b and the filter rod 63a, 63b.

The modules can be reconfigured to vary the cigarette assembly process as desired, for example by replacing one or more of the drums. Also, the modules can be repositioned relative to one another and/or one or more modules may be added/removed so as to provide yet further cigarette assembly options.

Figure 14:
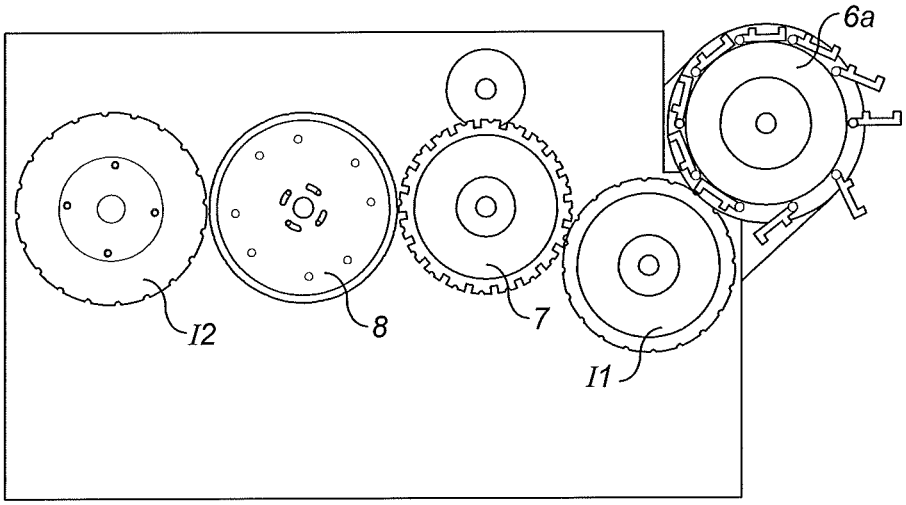
FIG. 14 illustrates a variation of the module of FIG. 1A.

Many further modifications and variations are possible. For example, although the module 1 of FIG. 1A receives "double length" tobacco rods one at a time from a tobacco rod maker, in some example multiple "double length" tobacco rods may be received at a time, for example from a "double track" tobacco rod maker. FIG. 14 shows a variation of the module 1 of the first type for use with a "double track" tobacco rod maker which makes two tobacco rods at a time. As shown, the modified module 1 of FIG. 14 has a modified take over drum 6a for receiving the two tobacco rods, and two additional intermediate transfer drums I1, I2. As shown, the takeover drum 6a has a plurality of pivoted arms, which each swing out sequentially in use to collect two tobacco rods from the maker. As the drum rotates further in an anticlockwise direction, the arms fall back into position against the drum. As illustrated in FIG. 14, the arms then deliver tobacco rods one at a time to the first intermediate transfer drum I1.

Other modules may also be included in certain configurations to carry out other operations. For example, a discharge module may be included in some arrangements to discharge assembled rod articles at different heights. The discharge module may be configured to discharge rods articles at a particular height for linking to a mass flow feed, for example to a conveyor to carry discharged rod articles to further machinery for further processing. Alternatively, the discharge height may be varied when discharge to a packaging machine is required, or when discharge to a tray filler for storage is required.

Further, although coupling filter rods to tobacco rods is described above, in some configurations a module may insert a component other than a filter rod, e.g: a rod article such as a tobacco rod, or a rod element comprising one or more plastic elements, e.g: twistable elements having first and second parts which can be rotated relative to one another to change the characteristics of a smoking article, as described for example in EP0395291A1.

According to various embodiments of the present invention, modules may carry out one or more of the following operations: transfer, insert separate, wrap, rotate, inspect, reject, press-together, laser-cut, turn, sample cigarettes for test, roll tipping. In embodiments, each module carries out two or more of these operations. Each individual operation may be carried out by a single functional unit (e.g: by a single drum).

As will be appreciated from the foregoing, the drums of the modules may be selected so that each module carries out a selected sequence of assembly operations. Also, the number of modules and their relative position may be chosen so that the modules carry out their respective assembly operations sequentially in a selected order.

In order to address various issues and advance the art, the entirety of this disclosure shows by way of illustration various embodiments in which the claimed invention(s) may be practiced and provide for superior apparatus and methods. The advantages and features of the disclosure are of a representative sample of embodiments only, and are not exhaustive and/or exclusive. They are presented only to assist in understanding and teach the claimed features. It is to be understood that advantages, embodiments, examples, functions, features, structures, and/or other aspects of the disclosure are not to be considered limitations on the disclosure as defined by the claims or limitations on equivalents to the claims, and that other embodiments may be utilised and modifications may be made without departing from the scope and/or spirit of the disclosure. Various embodiments may suitably comprise, consist of or consist essentially of various combinations of the disclosed elements, components, features, parts, steps, means, etc. In addition, the disclosure includes other inventions not presently claimed, but which may be claimed in future.

The invention claimed is:

1. A modular apparatus for smoking article assembly, comprising:

a plurality of modules [having a plurality of], *each comprising a plurality of functional units, each of said plurality of modules comprising a single* respective interface [units] *unit*, and a controller configured to control *each of said plurality of functional units on each of* said plurality of modules via said interface units, *wherein the interface unit of each module is configured to meditate communication between the controller and said plurality of functional units on the module,* wherein the modular apparatus is configured to cause received rods of smokable material to undergo a first sequence of operations, wherein each said module comprises one or more drums and the controller controls said one or more drums of each said module via the interface unit of its module, and wherein the modular apparatus can be reconfigured by replacing at least one of said drums of at least one of said plurality of modules so as to cause received rods of smokable material to undergo a second sequence of operations, different to the first sequence of operations, and wherein the first sequence of operations and the second sequence of operations respectively form at least part of first and second processes for assembling smoking articles, each smoking article comprising a said rod of smokable material, which is smoked in use.

2. The modular apparatus for smoking article assembly as claimed in claim 1, wherein each said drum has a respective drive mechanism, wherein each of said drive mechanisms is controlled by the controller via the interface unit of its module.

3. The modular apparatus as claimed in claim 2, wherein each of said drive mechanisms comprises an integrated servo drive.

4. The modular apparatus as claimed in claim 1, wherein the modules receive electrical power from the controller via the interface units.

5. The modular apparatus according to claim 1, further comprising:

a first inserter configured to insert a first rod article between two tobacco rods; a first rod divider configured to divide the first rod article into at least two parts, a separator configured to separate a first group comprising a rod of smokable material and one of said parts from a second group comprising a rod of smokable material and another of said parts, and a second inserter configured to insert a second rod article between the first and second groups.

6. The modular apparatus as claimed in claim 5, further comprising:

a second rod divider configured to divide the second rod article into at least two parts; and a wrapping station configured to wrap a wrapper at least partially around an inserted rod article after the inserted rod article is inserted between the two tobacco rods and before the inserted rod article is divided by a rod divider.

7. The modular apparatus as claimed in claim 5, wherein the modular apparatus comprises a first module comprising said first inserter, and a second module comprising said second inserter.

8. The modular apparatus as claimed in claim 1, comprising:

a plurality of inserters, each said inserter being configured to insert a rod article between two tobacco rods;

a plurality of rod dividers, each said rod divider being configured to divide a rod article into at least two parts, and a plurality of wrapping stations, each said wrapping station being configured to wrap a wrapper at least partially around an inserted rod article after the rod article is inserted between two tobacco rods and before the inserted rod article is divided by a rod divider.

9. The modular apparatus as claimed in claim 1, wherein the modular apparatus includes a plurality of modules of different types having different functions.

10. The modular apparatus as claimed in claim 1, wherein the modular apparatus includes two or more modules, each having a separate base unit and one or more drums, wherein each of said two or more modules is configured to receive the same number of drums.

11. The modular apparatus as claimed in claim 10, wherein each of said two or more modules are configured to receive drums in corresponding positions with respect to the respective base unit.

12. The modular apparatus as claimed in claim 1, wherein said first process for assembling smoking articles forms a first configuration of smoking article and wherein said second process for assembling smoking articles forms a second configuration of smoking article different to the first configuration.

13. The modular apparatus as claimed in claim 1, wherein said first sequence of operations and said second sequence of operations cause rods of smokable material to be respectively combined with one or more rod articles.

14. The modular apparatus as claimed in claim 1, comprising a plurality of modules configured to receive said rods of smokable material, said plurality of modules comprising a plurality of functional units configured to conduct said first sequence of operations.

15. The modular apparatus as claimed in claim 14, wherein said functional units comprise a plurality of conveying elements arranged to define a conveyance path through the modular apparatus, along which rods of smokable material are caused to undergo said first sequence of operations.

16. The modular apparatus as claimed in claim 1, wherein said modular apparatus can be reconfigured by repositioning modules relative to one another and/or removing one or more of the modules and/or adding one or more further modules.

17. The modular apparatus as claimed in claim 1, wherein said plurality of modules comprise a reconfigurable module, wherein reconfiguration of the modular apparatus comprises reconfiguring said reconfigurable module.

18. The modular apparatus as claimed in claim 1, wherein when reconfigured, the modular apparatus comprises a plurality of modules, said plurality of modules comprising a plurality of functional units configured to conduct said second sequence of operation.

19. The modular apparatus as claimed in claim 1, wherein modules are arranged in a row to cause said rods of smokable material to undergo said first sequence of operations and said second sequence of operations.

20. The modular apparatus as claimed in claim 1, wherein at least one module is left unchanged when the modular apparatus is reconfigured for said second sequence of operations.

21. The modular apparatus as claimed in claim 20, wherein said at least one module which is left unchanged comprises an in-feed module configured to receive rods of smokable material.

22. The modular apparatus as claimed in claim 1, wherein each module comprises one or more servo motors and wherein said servo motors are synchronized.

23. The modular apparatus as claimed in claim 1, wherein the modular apparatus comprises a first group-forming apparatus configured to associate a rod of smokable material with a rod article to form a first group, and a second group-forming apparatus configured to associate a rod article with the first group to form a second group.

24. The modular apparatus as claimed in claim 23, wherein the modular apparatus comprises a first module comprising said first group-forming apparatus and a second module comprising said second group-forming apparatus.

25. The modular apparatus as claimed in claim 1, comprising a first wrapping station to apply a first wrapper to the smoking article and a second wrapping station to apply a second wrapper to the smoking article after the first wrapper is applied.

26. The modular apparatus as claimed in claim 25, wherein the second wrapping station is configured to apply the second wrapper so that it overlaps with the first wrapper.

27. The modular apparatus as claimed in claim 25, wherein the second wrapping station is configured to apply to the second wrapper so that there is a longitudinal gap between the first wrapper and the second wrapper.

28. The modular apparatus as claimed in claim 25, wherein the first wrapping station is included in a first module and the second wrapping station is included in a second module.

29. A smoking article assembling apparatus comprising a modular apparatus as claimed in claim 1.

30. The smoking article assembling apparatus as claimed in claim 29, further comprising a tobacco rod source, wherein the modular apparatus is arranged to receive tobacco rods from the tobacco rod source.

31. The smoking article assembling apparatus as claimed in claim 30, wherein the modular apparatus is arranged to receive tobacco rods directly from the tobacco rod source.

32. The modular apparatus of claim 1, wherein at least one of the plurality of modules is a reconfigurable module comprising a base unit configured to removably receive a plurality of different parts.

33. The modular apparatus as claimed in claim 32, wherein in a first configuration of the reconfigurable module, the base unit is fitted with a rod-receiving component to receive a group of rod articles, a rod-cutting component to cut a central rod in said group of received articles into two segments, and a rod-separating component to separate the segments, thereby to form two spaced rod groups.

34. The modular apparatus as claimed in claim 33, wherein in a second configuration of the reconfigurable module, the base unit is fitted with a rod-receiving component to receive two tobacco rods which are longitudinally separated by a gap, a rod-insertion component to insert a rod article in the gap, a rod-cutting component to cut an inserted rod article into two segments, and a rod separating component to separate the segments, thereby to form two spaced rod groups.

35. The modular apparatus as claimed in claim 34, wherein in a third configuration of the reconfigurable module, the base unit is fitted with a rod-receiving component to receive two tobacco rods separated by a gap, a rod-insertion component to insert a rod article in the gap, and a wrapping station to apply a wrapper around an inserted rod article.

36. The modular apparatus in claim 32, comprising a drum-receiving portion adapted to selectively receive a first drum and a second drum.

37. The modular apparatus in claim 36, comprising a suction control element configured to apply suction to either the first or the second drum.

38. The modular apparatus in claim 37, comprising four drums.

[39. A kit of parts to assemble a modular apparatus as claimed in claim 1.]

*40. The modular apparatus of claim 1, wherein the plurality of modules comprises a plurality of functional units configured to define a first conveyance path along which each of the rods of smokeable material are conveyed and to cause rods of smokeable material to undergo said first sequence of operations, and when the modular apparatus is reconfigured, the plurality of functional units are configured to define a second conveyance path along which each of the rods of smokeable material are conveyed and to cause rods of smokeable material to undergo said second sequence of operations.*

*41. The modular apparatus of claim 10, wherein each base unit comprises four drum-receiving shafts, each adapted for removably receiving a drum.*

*42. The modular apparatus of claim 11, wherein each base unit comprises four drum-receiving shafts, each adapted for removably receiving a drum.*

* * * * *